United States Patent
Hubbard et al.

(10) Patent No.: US 10,410,295 B1
(45) Date of Patent: Sep. 10, 2019

(54) METHODS, SYSTEMS AND COMPUTER PROGRAM PRODUCTS FOR OBTAINING TAX DATA

(71) Applicant: INTUIT INC., Mountain View, CA (US)

(72) Inventors: Paul F. Hubbard, San Diego, CA (US); Nankun Huang, San Diego, CA (US); Amir R. Eftekhari, San Diego, CA (US); Justin C. Marr, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 534 days.

(21) Appl. No.: 15/164,777

(22) Filed: May 25, 2016

(51) Int. Cl.
  *G06Q 40/00* (2012.01)
  *G06F 3/0484* (2013.01)
  *G06N 5/02* (2006.01)
  *G06N 5/04* (2006.01)

(52) U.S. Cl.
  CPC ......... *G06Q 40/123* (2013.12); *G06F 3/0484* (2013.01); *G06N 5/022* (2013.01); *G06N 5/04* (2013.01)

(58) Field of Classification Search
  CPC .................................................. G06Q 40/123
  See application file for complete search history.

(56) References Cited

U.S. PATENT DOCUMENTS

| | | | |
|---|---|---|---|
| 6,691,116 B1 * | 2/2004 | Bart | G06F 16/258 |
| 6,718,336 B1 * | 4/2004 | Saffer | G06F 16/25 |
| 7,565,312 B1 | 7/2009 | Shaw et al. | |
| 7,668,763 B1 | 2/2010 | Albrecht | |
| 7,747,484 B2 | 6/2010 | Stanley et al. | |
| 7,756,761 B1 | 7/2010 | Albrecht | |
| 7,805,343 B1 | 9/2010 | Lyons et al. | |
| 7,853,494 B2 | 12/2010 | Wyle | |
| 7,860,763 B1 | 12/2010 | Quinn et al. | |
| 7,912,767 B1 | 3/2011 | Cheatham et al. | |
| 8,126,787 B1 | 2/2012 | Leek et al. | |
| 8,204,805 B2 | 6/2012 | Eftekhari et al. | |
| 8,355,966 B1 | 1/2013 | Vu et al. | |
| 8,606,665 B1 * | 12/2013 | Shaw | G06Q 40/123 705/31 |
| 9,069,869 B1 | 6/2015 | Quinn et al. | |
| 9,201,558 B1 * | 12/2015 | Dingman | G06F 3/048 |

(Continued)

FOREIGN PATENT DOCUMENTS

WO    WO2002019229 A2 *    3/2002    ............. G06F 17/60

OTHER PUBLICATIONS

"Intuit Takes Typing Out of Professional Tax Prep", Business Wire, Aug. 24, 2010. (Year: 2010).*

(Continued)

*Primary Examiner* — Eric T Wong
(74) *Attorney, Agent, or Firm* — DLA Piper LLP US

(57) ABSTRACT

A tax data collection system includes a navigation module configured to obtain user data. The system also includes a data graph including information relating to the user data. The system further includes a knowledge engine configured to map the user data onto a data model using the information from the data graph. Moreover, the system includes an inference engine configured to suggest a system action by analyzing at least the data model after the user data has been mapped thereon.

22 Claims, 40 Drawing Sheets

(56) References Cited

U.S. PATENT DOCUMENTS

| | | |
|---|---|---|
| 9,444,824 B1 | 9/2016 | Balaz et al. |
| 9,734,136 B1 | 8/2017 | Mody et al. |
| 9,786,017 B1 | 10/2017 | Ohme et al. |
| 9,787,597 B1 | 10/2017 | Miller |
| 2002/0111888 A1* | 8/2002 | Stanley ............... G06Q 40/02 705/31 |
| 2004/0078271 A1 | 4/2004 | Morano et al. |
| 2004/0254927 A1 | 12/2004 | Lang et al. |
| 2006/0085304 A1 | 4/2006 | Buarque De Macedo et al. |
| 2006/0287890 A1* | 12/2006 | Stead ............... G16H 10/60 705/3 |
| 2007/0033130 A1 | 2/2007 | Murray |
| 2007/0250418 A1 | 10/2007 | Banks et al. |
| 2008/0189757 A1 | 8/2008 | Schackow et al. |
| 2010/0146523 A1 | 6/2010 | Brigaut et al. |
| 2010/0274606 A1 | 10/2010 | Fain et al. |
| 2011/0066602 A1* | 3/2011 | Studer ............... G06F 17/2264 707/690 |
| 2012/0136764 A1 | 5/2012 | Miller et al. |
| 2014/0032259 A1* | 1/2014 | LaFever ............ G06Q 30/0201 705/7.29 |
| 2014/0068413 A1 | 3/2014 | Christensen |
| 2014/0172656 A1* | 6/2014 | Shaw ............... G06Q 40/00 705/31 |
| 2014/0258063 A1* | 9/2014 | Chourasia ............ G06Q 40/00 705/35 |
| 2015/0081470 A1 | 3/2015 | Westphal |
| 2016/0275627 A1 | 9/2016 | Wang et al. |

OTHER PUBLICATIONS

Office Action dated Feb. 12, 2018 in U.S. Appl. No. 14/810,116, filed Jul. 27, 2015, (43pages).

https://www.puffinbrowser.com/index.php), Jul. 27, 2015 (5pages).

U.S. Appl. No. 14/810,116, filed Jul. 27, 2015, Inventor: Amir Eftekhari et al., (unpublished).

U.S. Appl. No. 14/871,366, filed Sep. 30, 2015, Inventor: Amir Eftekhari et al., (unpublished).

U.S. Appl. No. 14/925,633, filed Oct. 28, 2015, Inventor: Amir Eftekhari et al., (unpublished).

U.S. Appl. No. 14/871,802, filed Sep. 30, 2015, Inventor: Amir Eftekhari et al., (unpublished).

* cited by examiner

|  | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 13

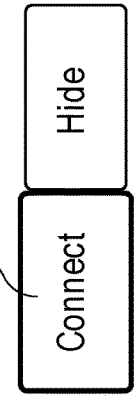
INFERRED ACCOUNTS
 H&R Block Tax Documents
Inferred from Chase Bank Transaction
| | | | |
|---|---|---|---|
| 03/16/2015 | FRAUD DISPUTE | | $92.93 |
| 03/16/2015 | ALAMO RENT-A-CAR HANOVER MD | | $44.51 |
| 03/16/2015 | H&R Block Tax Prep | | $89.25 |
| 03/16/2015 | RECREATION.GOV 888-448-1474 NY | | $6.00 |
| 03/16/2015 | FUDDRUCKERS 3353 COLUMBIA MD | | $23.08 |
| 03/14/2015 | AN LOI COLUMBIA MD | | $28.00 |
FIG. 22

Income from Qualcomm
Inferred from Chase Bank Transaction

- 10/26/2015  LUO YANQIN DES:IAT PAYPAL ID:43RJ296413QT  C  -454.52
  INDN CO...
- 10/19/2015  INVOICE CLOUD DES:EPAYMEN ID:7596062  C  -0.95
  INDN: CO ID:xxxxx63576 TEL
- 10/19/2015  MARION COUNTY DES:TAX ID: 7596099  C  -26.40
  INDN:* CO ID:xxxxx63526 TEL
- 10/16/2015  QUALCOMM DES: DIRECT DEP  C  1,424.09
  ID:xxxxxx66856340x3 INDN: WONG, JENNY CO
  ID:xxxxx11102 PPD
- 10/07/2015  Property Managem DES:WEB PXTS ID: 6YOBJ  C  720.00
  INDN:CO ID: xxxxx34801 PPD

116

Wells Fargo Mortgage

Obtained from WellsFargo on 3/1/2016

2014 Mortgage Interest 1098E

2015 Dec Mortgage Bill

116
Connect all accounts
Connect all of your accounts wit one tap
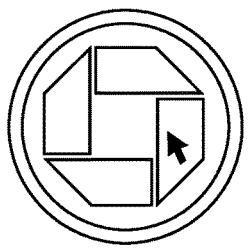
Let's connect these accounts to continue.
FIG. 25

INFERRED ACCOUNTS

INFERRED ACCOUNTS

116

[H&R BLOCK] Encrypting your credentials | [H&R BLOCK] Establishing secure link

[ADP] Encrypting your credentials | [ADP] Establishing secure link

[WELLS FARGO] Encrypting your credentials | [WELLS FARGO] Establishing secure link

FIG. 28

116
✓ CONNECTED ACCOUNTS
 Chase Bank interest income
Connected on 3/1/2016
 H&R Block Tax Documents
Connected on 3/1/2016
Obtained from H&R Block on 3/1/2016
2014 1040A PDF
2013 1040EZ PDF
 Income from Qualcomm
Connected on 3/1/2016
Obtained from Qualcomm on 3/1/2016
2014 W2 PDF
2015 PayStub
 Wells Fargo Mortgage
Connected on 3/1/2016
Obtained from WellsFargo on 3/1/2016
2014 Mortgage Interest 1098E
2015 Dec Mortgage Bill
FIG. 30

116
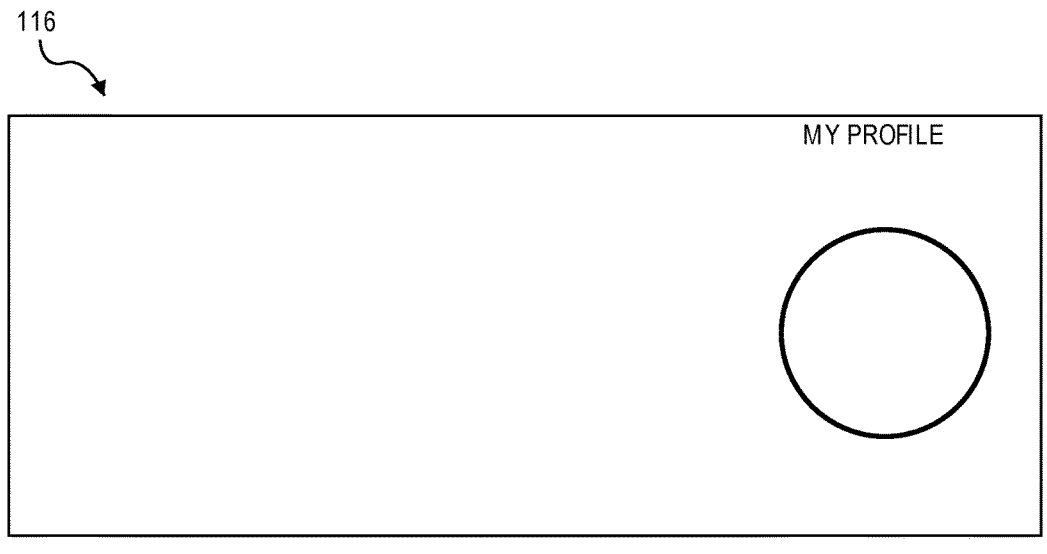
MY PROFILE
MY ACCOUNTS
PERSONAL INFO 
DOCUMENTS
FIG. 38

MY PROFILE

ADP

TurboTax

Wells Fargo Home Mortgage

LinkedIn

Facebook

Chase

FIG. 39

EDIT ACCOUNT 140-10

Username
vkrishna

Password
●●●●●●●●●●●●●●●●●●

Password last changed: 23 days ago

Show Password

SAVE

DELETE ACCOUNT

METHODS, SYSTEMS AND COMPUTER PROGRAM PRODUCTS FOR OBTAINING TAX DATA

SUMMARY

Embodiments are directed to systems, computer-implemented methods, and computer program products for obtaining tax data for tax return preparation programs.

In one embodiment directed to a tax data collection system, the system includes a navigation module configured to obtain user data. The system also includes a data graph including information relating to the user data. The system further includes a knowledge engine configured to map the user data onto a data model using the information from the data graph. Moreover, the system includes an inference engine configured to suggest a system action by analyzing at least the data model after the user data has been mapped thereon.

In one or more embodiments, the user data includes tax data. The information may include a data format, a data label, a data category, and/or a data mapping instruction. The knowledge engine may be configured to validate mapping of the user data onto the data model.

In one or more embodiments, the knowledge engine is configured to determine whether the data model is complete after mapping the user data onto the data model. The inference engine may be configured to identify additional user data based on analyzing at least the data model after the user data has been mapped thereon, when the knowledge engine determines that the data model is not complete. The system action may include obtaining additional user data using the navigation module.

In another embodiment directed to a method for obtaining tax data, the method includes obtaining first user account information. The method also includes accessing a first user account using the first user account information. The method further includes obtaining first user data from the first user account. Moreover, the method includes identifying a second user account based on analysis of first user data. In addition, the method includes requesting second user account information related to the second user account.

In one or more embodiments, the method includes instructing display of a user interface that prompts a user to provide the first user account information. The user interface may include information identifying a plurality of accounts likely to include tax data.

In one or more embodiments, the method also includes obtaining the second user account information. The method further includes accessing the second user account using the second user account information. Moreover, the method includes obtaining second user data from the second user account. In addition, the method includes mapping the second user data onto a data model.

In one or more embodiments, the method includes determining whether the data model is complete after mapping the second user data onto the data model. The first user account information may be selected from the group consisting of a first user account website, a first user account identification, and a first user account password.

In still another embodiment directed to a method for obtaining tax data, the method includes obtaining user account information. The method also includes accessing a user account using the user account information. The method further includes obtaining user data from the user account. Moreover, the method includes identifying the user data as potentially relevant to a tax return of a user. In addition, the method includes presenting the user data to the user to determine a relevance thereof to the tax return of the user.

In one or more embodiments, the method includes instructing display of a user interface that prompts a user to provide the user account information. The user interface may include information identifying a plurality of accounts likely to include tax data.

In one or more embodiments, the method includes presenting a question to the user based on the user data, where the question is configured to elicit an answer related to the relevance of the user data. The method may also include determining that the user data is relevant to the tax return of the user. The method may also include mapping the user data onto a data model. The method may also include determining whether the data model is complete after mapping the user data onto the data model.

In yet another embodiment directed to a computer program product including a non-transitory computer readable storage medium embodying one or more instructions executable by a computer system having a server computer and a tax return preparation computer to perform a process for obtaining tax data, the process includes obtaining first user account information, accessing a first user account using the first user account information, obtaining first user data from the first user account, identifying a second user account based on analysis of first user data, and requesting second user account information related to the second user account.

In still another embodiment directed to a computer program product including a non-transitory computer readable storage medium embodying one or more instructions executable by a computer system having a server computer and a tax return preparation computer to perform a process for obtaining tax data, the process includes obtaining user account information, accessing a user account using the user account information, obtaining user data from the user account, identifying the user data as potentially relevant to a tax return of a user, and presenting the user data to the user to determine a relevance thereof to the tax return of the user.

BRIEF DESCRIPTION OF THE DRAWINGS

The foregoing and other aspects of embodiments are described in further detail with reference to the accompanying drawings, in which the same elements in different figures are referred to by common reference numerals, wherein:

FIG. 13 illustrates a decision table based on or derived from the completion graph of FIG. 12.

FIGS. 17-40 are various screen shots depicting user interactions with an automatic tax data acquisition system running along with a tax return preparation system according to various embodiments.

Figure 1:
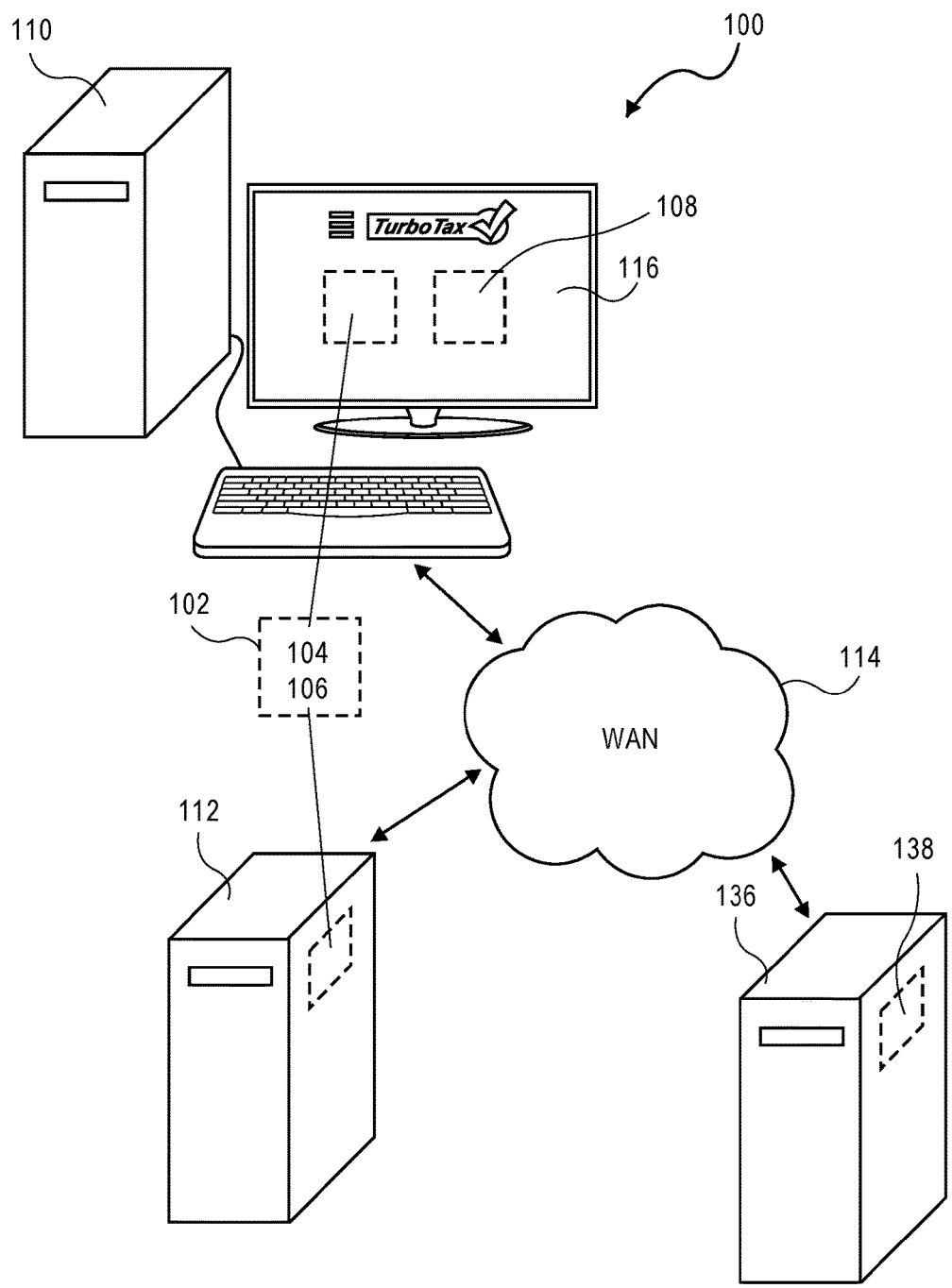
FIGS. 1 to 6 are schematic diagrams illustrating the implementation of automatic tax data acquisition systems on computing devices according to various embodiments.

In order to better appreciate how to obtain the above-recited and other advantages and objects of various embodiments, a more detailed description of embodiments is provided with reference to the accompanying drawings. It should be noted that the drawings are not drawn to scale and that elements of similar structures or functions are represented by like reference numerals throughout. It will be understood that these drawings depict only certain illustrated embodiments and are not therefore to be considered limiting of scope of embodiments.

DETAILED DESCRIPTION OF ILLUSTRATED EMBODIMENTS

During preparation of tax returns, tax data must be acquired to complete the tax return. While tax data can be entered manually by a user/preparer, many electronic tax return preparation systems can acquire some tax data automatically (without human intervention after authorization) or semi-automatically (with minimal human intervention—e.g., provision of financial account authentication information) from third party websites hosted on third party computers through a network, such as the Internet.

Tax return preparation can be performed by the taxpayer, a tax professional, or other preparer using an electronic tax return preparation program. Regardless of who prepares the tax return, a manual tax return preparation system requires the preparer to answer a standard list of questions that are presented in a standard order in an interview/questionnaire format. This can be tedious for the preparer, and result in data entry errors that may have serious financial consequences. The manual tax return preparation process also requires a lengthy time commitment that may be a barrier to tax preparation. While some systems allow for preparers to save returns and resume preparation at a later time, these interruptions can lead to errors related to restarting the process or unfinished tax returns.

Tax data is typically found on paper or electronic documents, which may not be immediately available to the user. Therefore, manually acquiring tax data for tax return preparation may include searching for paper documents, or accessing electronic documents or information from a third party website ("tax data websites"; e.g., payroll processor websites for W-2 information, banking account websites for 1099-INT information, brokerage account websites for 1099-DIV information, etc.) hosted on a third party computer. Consequently, the manual tax return preparation process is often paused or halted one or more times for the user to acquire tax data needed to complete the tax return. These disruptions in the tax return preparation process are opportunities for the user to walk away from the process, which can also lead to errors related to restarting the process or unfinished tax returns.

While preparing a tax returning using an online electronic tax return preparation system, tax data from third party websites can be entered manually by the user, automatically, and/or semi-automatically. Manual data entry typically involves opening a new browser in a new window or a new tab. Tax data obtained from the new browser (e.g., data or electronic documents) must then be manually entered or uploaded into the online electronic tax return preparation system. While this manual process can successfully acquire tax data, it introduces further opportunities for user error, and it can frustrate users who must switch between software experiences.

Alternative to manual tax data entry include automatic and semi-automatic tax data acquisition. Traditionally, acquiring tax data from third party websites through networks has been automated (including automatic and semi-automatic tax data acquisition) using one of two solutions: Application Programming Interface ("API") connection to a third party computer through a network; and screen scraping of third party webpages accessed through a network.

However, even automatic and semi-automatic tax data acquisition systems have limitations. For instance, existing automatic and semi-automatic tax data acquisition systems require some sort of identification of tax data sources (e.g., from a previous year's tax return or direct user input). Therefore, existing automatic and semi-automatic tax data acquisition systems cannot identify tax data sources that are unknown to the user. For instance, a user may not recognize a tax data source as such. Also, a user may not realize that a new data source can provide tax data. Further, changes in certain data sources (e.g., online banking, financial management systems, and government websites) may provide additional tax data unbeknownst to the user, or result in new tax data sources. Alternatively, changes may render previous tax data sources less useful. Moreover, changes in laws or regulations (e.g., reporting or disclosure rules) may render previous tax data sources more or less useful, and may result in new tax data sources. Navigating this complex web of possible tax data source changes can limit the effectiveness of automatic and semi-automatic tax data acquisition systems, and/or result in unaccounted for tax data. Missing tax data can in turn result in tax return errors that can have serious financial consequences for the taxpayer.

Embodiments describe methods, systems and articles of manufacture for automatically obtaining tax data for tax return preparation programs by analyzing user data to identify tax data sources. In particular, the embodiments describe using navigation modules, data graphs, knowledge engines, and inference engines to implement a system for identifying tax data sources to facilitate obtaining tax data. The system also facilitates obtaining tax data while minimizing user input and effort. The system further facilitates user interaction during tax return preparation.

In one embodiment, the navigation module obtains user data, such as tax data. Next, a knowledge engine maps the user data onto a data model using information from a data graph. The information from the data graph may relate to the user data, and may be data mapping instructions. Then, an inference engine suggests a system action by analyzing the data model including the mapped user data. The system action may be to obtain additional user data using the navigation module, especially when the knowledge engine determines that the data model is incomplete after mapping the user data thereon.

Obtaining user data and mapping the obtained user data to a data graph facilitates automated or semi-automated collection of tax data for electronic tax return preparation by identifying tax data sources applicable to a particular taxpayer. The data graphs organize the tax data needed to prepare the tax return and the iterative process utilizes a navigation module, a knowledge engine, and an inference engine to complete and run the data graphs to automate the tax data collection and tax data source identification processes. Automating the identification of tax data sources and collection of tax data saves users/preparer time and may increase the rate of completion of tax returns by lowering barriers to completion. Even partially automating tax data collection can achieve these goals. Identifying tax data sources can also streamline the user interview/questionnaire process, thereby minimizing required user time and effort.

As used in this application, a "user," "preparer" or "taxpayer" includes, but is not limited to, a person preparing a tax return using tax return preparation software. The "user," "preparer" or "taxpayer" may or may not be obligated to file the tax return. As used in this application, a "previous tax return" or "prior tax return" includes, but is not limited to, a tax return (in electronic or hard copy form) for a year before the current tax year. As used in this application, "tax data" includes, but is not limited to, information that may affect a user's income tax burden, including but not limited to, information typically included in a tax return. The term "tax data," as used in this application, also includes, but is not limited to, partially or fully completed tax forms (electronic, hard copy and images thereof) that include information typically included in a tax return. As used in this application, "tax document" includes, but is not limited to, physical documents containing tax data, and images thereof. As used in this application, "user data" includes, but is not limited to, data that relates to a user.

As used in this application, "financial management program" or "financial management system" includes, but is not limited to, software that oversees and governs an entity's income, expenses, and assets. An exemplary financial management system is MINT Financial Management Software, which is available from Intuit Inc. of Mountain View, Calif. A financial management system is executed to assist a user with managing its finances. Financial management systems manage financial transaction data from financial transaction generators such as accounts including checking, savings, money market, credit card, stock, loan, mortgage, payroll or other types of account. Such financial transaction generators can be hosted at a financial institution such as a bank, a credit union, a loan services or a brokerage. Financial transaction data may include, for example, account balances, transactions (e.g., deposits, withdraws, and bill payments), debits, credit card transactions (e.g., for merchant purchases). Financial management systems can also obtain financial transaction data directly from a merchant computer or a point of sale terminal. Financial management systems can include financial transaction data aggregators that manage and organize financial transaction data from disparate sources. While certain embodiments are described with reference to MINT Financial Management Software, the embodiments described herein can include other financial management systems such as QUICKEN Financial Management Software, QUICKRECIPTS Financial Management Software, FINANCEWORKS Financial Management Software, Microsoft Money Financial Management Software and YODLEE Financial Management Software (available from Yodlee, Inc. of Redwood City, Calif.).

As used in this application, "computer," "computer device," or "computing device" includes, but is not limited to, a computer (stationary/desktop or portable/laptop) and a computer or computing device of a handheld mobile communication device, smartphone and tablet computing device such as an IPHONE or an IPAD (available from Apple Inc. of Cupertino, Calif.). As used in this application, "tax preparation system," "tax preparation computing device," "tax preparation computer," "tax preparation software," "tax preparation module," "tax preparation application," "tax preparation program," "tax return preparation system," "tax return preparation computing device," "tax return preparation computer," "tax return preparation software," "tax return preparation module," "tax return preparation application," or "tax return preparation program" includes, but is not limited to, one or more separate and independent software and/or hardware components of a computer that must be added to a general purpose computer before the computer can prepare tax returns, and computers having such components added thereto.

As used in this application, "user computer" or "user computing device" includes, but is not limited to, one or more separate and independent software and/or hardware components of a computer that must be added to a general purpose computer before the computer can communicate with a server computer and display implement a user interface for interaction with a user, and computers having such components added thereto. As used in this application, "server," "server computer" or "server computing device" includes, but is not limited to, one or more separate and independent software and/or hardware components of a computer that must be added to a general purpose computer before the computer can receive and respond to requests from other computers and software in order to share data or hardware and software resources among the other computers and software, and computers having such components added thereto. As used in this application, "mobile computer," "handheld computer," "mobile computing device" or "handheld computing device" includes, but is not limited to, computers configured (e.g., having a form factor) to be held in a hand of a user during the normal course of use. As used in this application, "stationary computer" or "stationary computing device" includes, but is not limited to, computers configured (e.g., having a form factor) to be stationary relative to a user during the normal course of use. As used in this application, "mobile application" includes, but is not limited to, one or more separate and independent software components of a computer that must be added to a general purpose handheld computer before the handheld computer can run the mobile application.

As used in this application, "user data computer" and "user data program" include, but are not limited to, one or more separate and independent software and/or hardware components of a computer that must be added to a general purpose computer before the computer can receive, generate, store and transmit user data to other computers and software, and computers having such components added thereto.

As used in this application, "input/output module" includes, but is not limited to, one or more separate and independent software and/or hardware components of a computer that must be added to a general purpose computer before the computer can communicate with and facilitate the receipt and transfer of information, including but not limited to, user data, tax data and data graphs, from and to other computers for tax data acquisition. As used in this application, "memory module" includes, but is not limited to, one or more separate and independent software and/or hardware components of a computer that must be added to a general purpose computer before the computer can store information, including but not limited to, user data, tax data and data graphs in proper formats for, e.g., tax data acquisition.

As used in this application, "navigation module" includes, but is not limited to, one or more separate and independent software and/or hardware components of a computer that must be added to a general purpose computer before the computer can access a website and obtain user data therefrom. As used in this application, "data graph" includes, but is not limited to, one or more separate and independent software and/or hardware components of a computer that must be added to a general purpose computer before the computer can store and communicate information relating to websites that may include user data and/or tax data. As used in this application, "knowledge engine" includes, but is not limited to, one or more separate and independent software and/or hardware components of a computer that must be added to a general purpose computer before the computer can map data onto a data graph. As used in this application, "inference engine" includes, but is not limited to, one or more separate and independent software and/or hardware components of a computer that must be added to a general purpose computer before the computer can analyze a data model and suggest a system action based on the result of the analysis. As used in this application, "user interface" includes, but is not limited to, one or more separate and independent software and/or hardware components of a computer that must be added to a general purpose computer before the computer can communicate with a user.

As used in this application, "speech processor" includes, but is not limited to, one or more separate and independent software and/or hardware components of a computer that must be added to a general purpose computer before the computer can synthesize speech. As used in this application, "synthesized speech" includes, but is not limited to, artificially produced human speech.

As used in this application, "website" includes, but is not limited to, one or more operatively coupled webpages. As used in this application, "browser," "web browser," "browser program," "web browser program," "browser application" or "web browser application" includes, but is not limited to, one or more separate and independent software and/or hardware components of a computer that must be added to a general purpose computer before the computer can receive, display and transmit resources from/to the World Wide Web.

FIG. 1 depicts an exemplary hardware system 100 on which an automatic tax return preparation system/program 102 according to one embodiment can be executed. The hardware system 100 according to this embodiment includes a server computing device 112 and a user computing device 110, which are operatively coupled via a network 114. The hardware system 100 is also operatively coupled (via the network 114) to a user data computing device 136, which hosts a user data program 138 having user data. The user computing device 110, the server computing device 112 and the user data computing device 136 are all stationary or desktop computers. The network 114 may be two or more networks depending on the system configuration and communication protocols employed. One or more or all of networks 114 may be, for example, a wireless or cellular network, a private communication network (e.g., mobile phone network), a Local Area Network (LAN) and/or a Wide Area Network (WAN). Reference to network 114 generally is not intended to refer to a specific network or communications protocol, and embodiments can be implemented using various networks 114 and combinations thereof.

In the embodiment depicted in FIG. 1, the automatic tax data acquisition system 102 has two portions, i.e., a user computer portion 104 and a server portion 106. The user computer portion 104 runs on the user computing device 110 and the server portion 106 runs on the server computing device 112. These portions 104, 106 are operatively coupled by the network 114. The automatic tax data acquisition system 102 is operatively coupled to an electronic tax return preparation system/program 108 that runs on the user computing device 110 in the embodiment depicted in FIG. 1. Examples of tax return preparation systems 108 that may be operatively coupled to the automatic tax data acquisition system 102 include desktop or online versions of TURBOTAX, PROSERIES, and LACERTE tax return preparation applications, available from Intuit Inc. TURBOTAX, PROSERIES AND LACERTE are registered trademarks of Intuit Inc., Mountain View Calif.

The various computing devices 110, 112, 136 may include visual displays or screens 116 operatively coupled thereto. In the embodiment depicted in FIG. 1, the user computing device 110 includes a display or screen 116 through which a user physically interfaces with the user computing device 110, and the tax return preparation system 108 and the server portion 106 of the automatic tax data acquisition system 102 running thereon.

Figure 2:
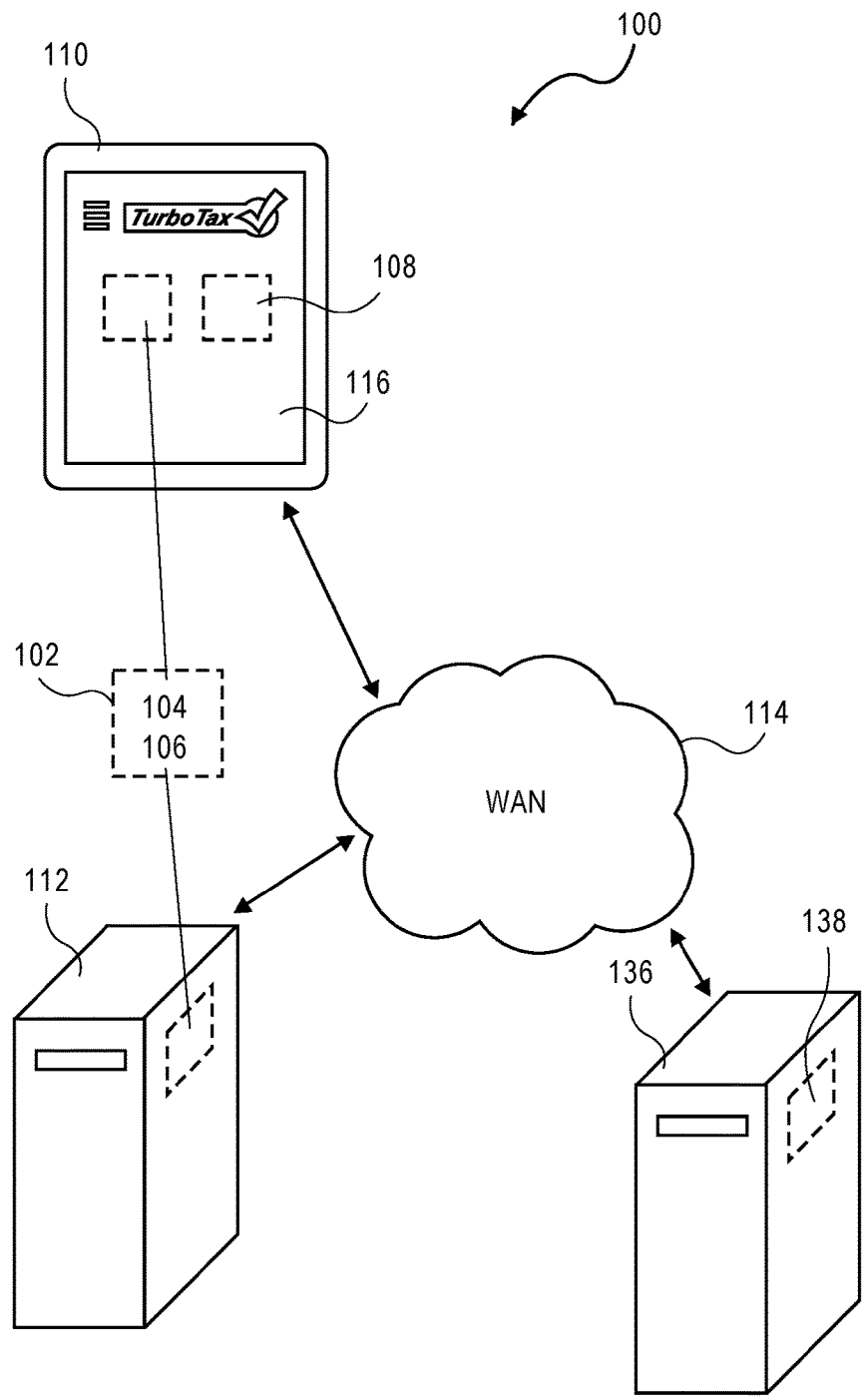
Figure 3:
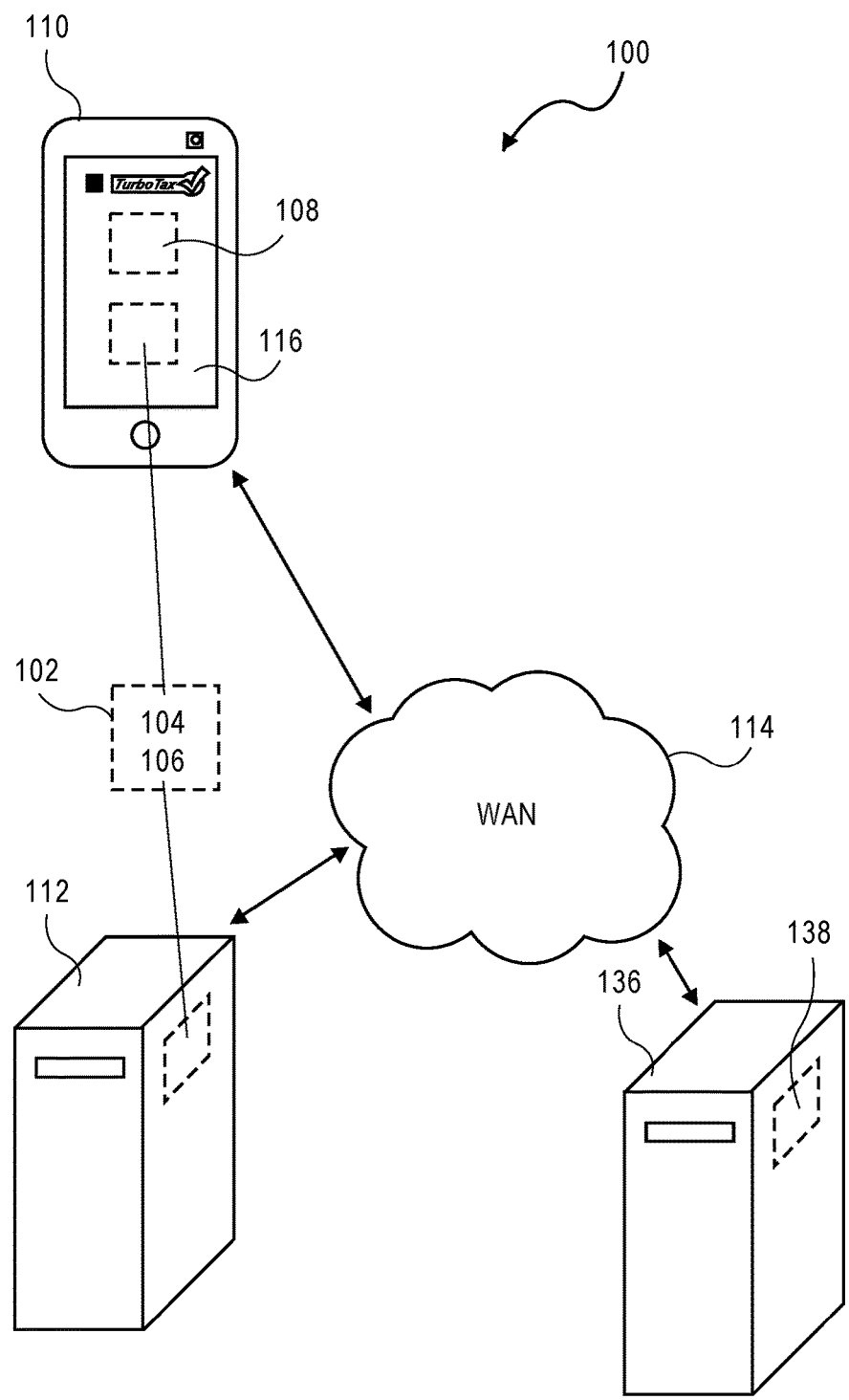

While the user computing device 110 depicted in FIG. 1 is a stationary computer, in other hardware system 100 embodiments, the user computing device 110 may be a mobile computer. For instance, in the hardware system 100 depicted in FIG. 2, the user computing device 110 is a handheld tablet computer. Further, in the hardware system 100 depicted in FIG. 3, the user computing device 110 is a handheld mobile phone, i.e., a smartphone.

Figure 4:
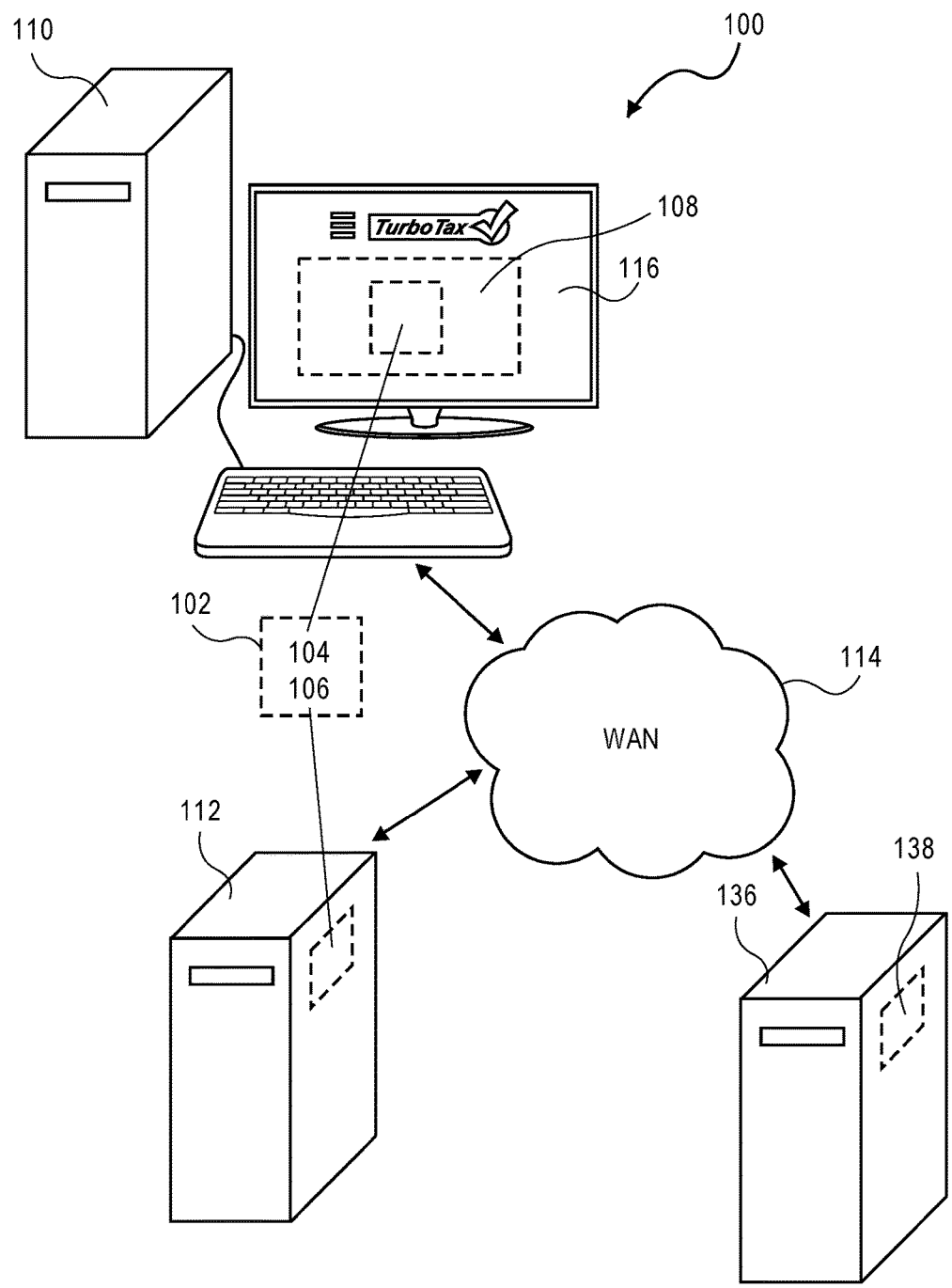

While the tax return preparation system 108 and the server portion 106 of the automatic tax data acquisition system 102 running on the user computing device 110 depicted in FIG. 1 are depicted as two separate systems, in other hardware system 100 embodiments, the tax return preparation system 108 or the server portion 106 may be a part of the other system. For instance, in the hardware system 100 depicted in FIG. 4, the server portion 106 of the automatic tax data acquisition system 102 is a part of the tax return preparation system 108.

Figure 5:
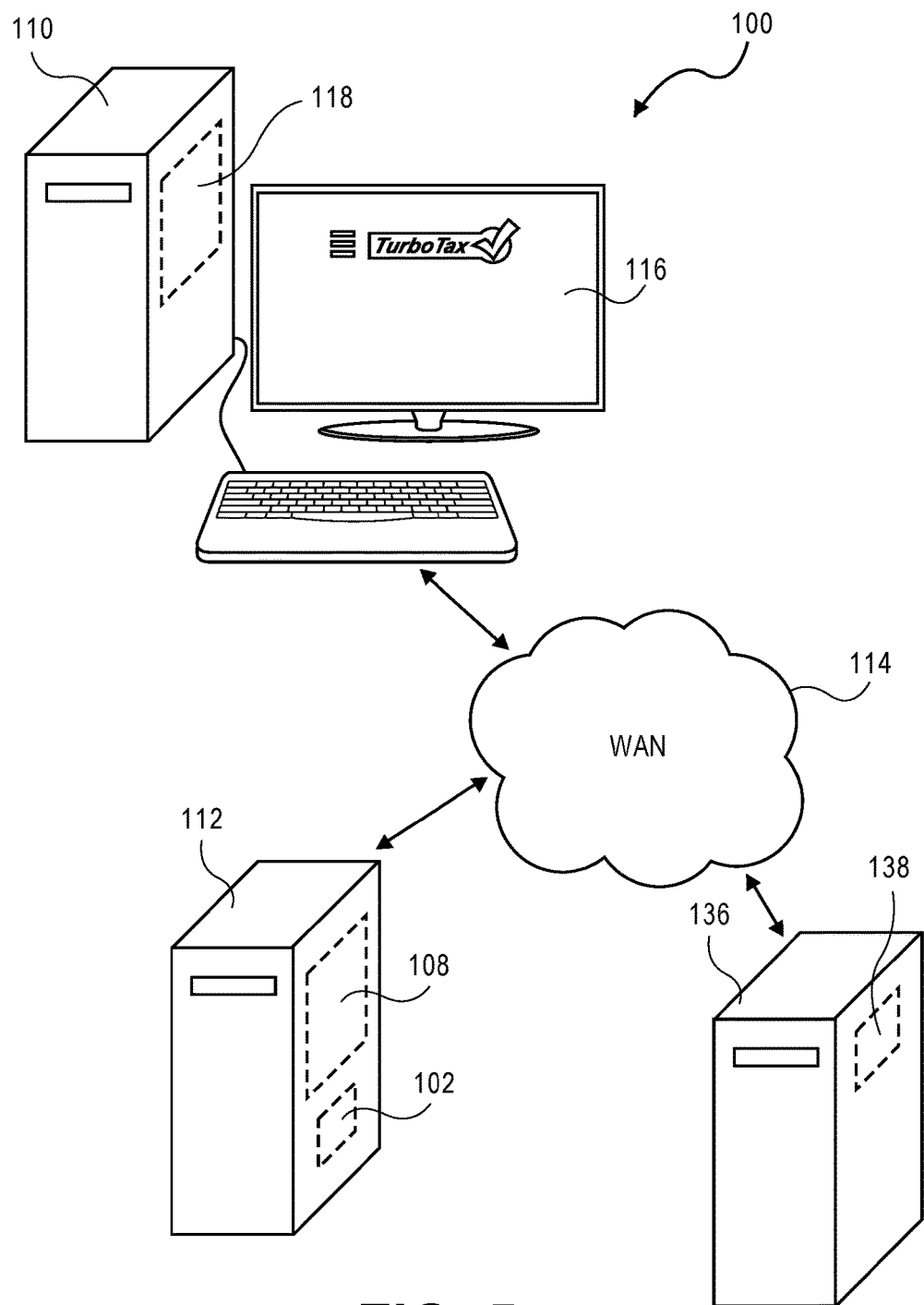

While the tax return preparation system 108 depicted in FIG. 1 is depicted as running on the user computing device 110, in other hardware system 100 embodiments, the tax return preparation system 108 runs on a server computing device. For instance, in the hardware system 100 depicted in FIG. 5, the tax return preparation system 108 runs on the server computing device 112. In that embodiment, the user accesses the tax return preparation system 108 through a web browser program 118 via the network 108. Also, in the embodiment depicted in FIG. 5, the automatic tax data acquisition system 102 is completely hosted on the server computing device 112, and does not have multiple portions running on different computing devices.

While the automatic tax data acquisition system 102 and the tax return preparation system 108 depicted in FIG. 1 run on the same server computing device 112, in other hardware system 100 embodiments, the automatic tax data acquisition system 102 and the tax return preparation system 108 run on different computing devices. For instance, in the hardware system 100 depicted in FIG. 6, the automatic tax data acquisition system 102 runs on a first server computing device 112, and the tax return preparation system 108 runs on a second server computing device 112'. The first and second server computing devices 112, 112' are operatively coupled to the user computing device 110 and the user data computing device 136 via the network 114.

Figure 7:
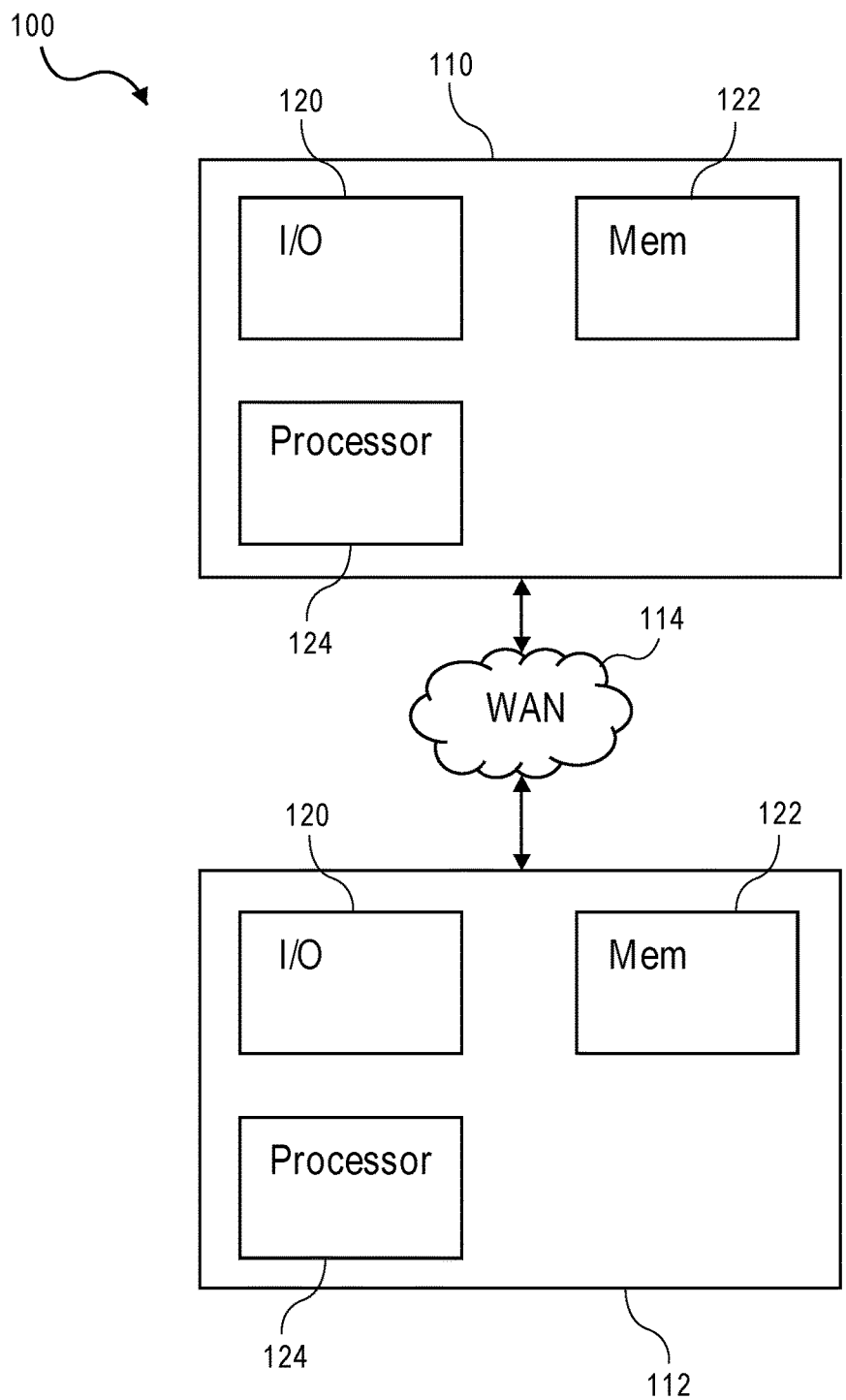
FIGS. 7 and 8 are block diagrams of computer systems according to various embodiments on which automatic tax data acquisition systems according to various embodiments may be implemented.

FIG. 7 depicts, in greater detail, a hardware system 100 configured to host an automatic tax data acquisition system 102 according to one embodiment. Like the hardware systems 100 depicted in FIGS. 1-5, the hardware system 100 in FIG. 7 includes a server computing device 112 and a user computing device 110 that are operatively coupled by a network 114. The server computing device 112 includes an input/output module 120, a memory module 122 and a processor 124. The user computing device 110 also includes an input/output module 120, a memory module 122 and a processor 124. The input/output modules 120 are configured to communicate with and facilitate the receipt and transfer of data, including user data, tax data and data graphs. The memory modules 122 are configured to store data, including user data, tax data and data graphs, in proper formats for, e.g., tax data acquisition. The processors 124 in the server computing device 112 and the user computing device 110 are configured to respectively run programs/applications (e.g., the tax return preparation system 108, the web browser program 118, the automatic tax data acquisition system 102, and the user computer portion 104 and the server portion 108 thereof), as shown in FIGS. 1-5.

Figure 6:
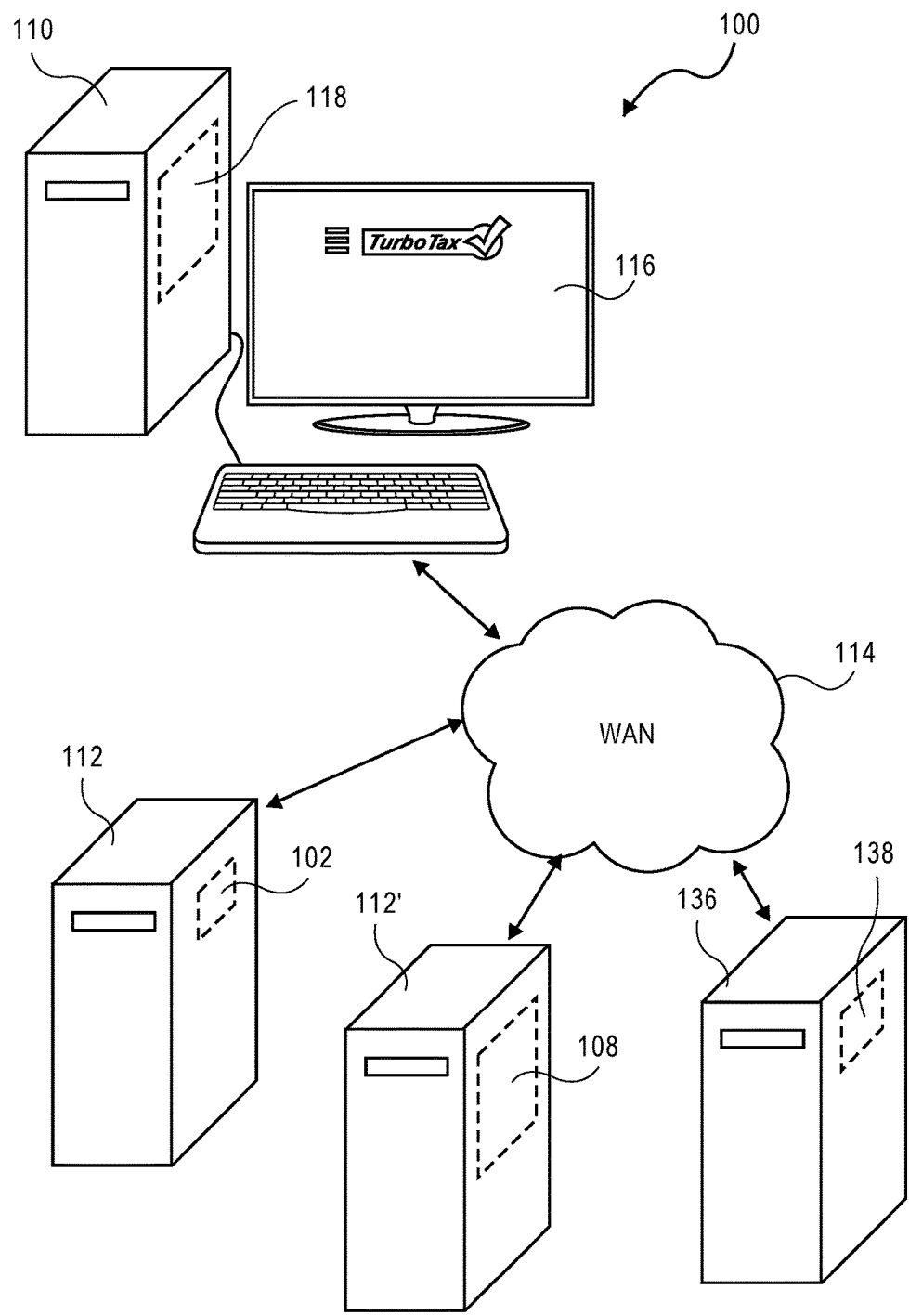
Figure 8:
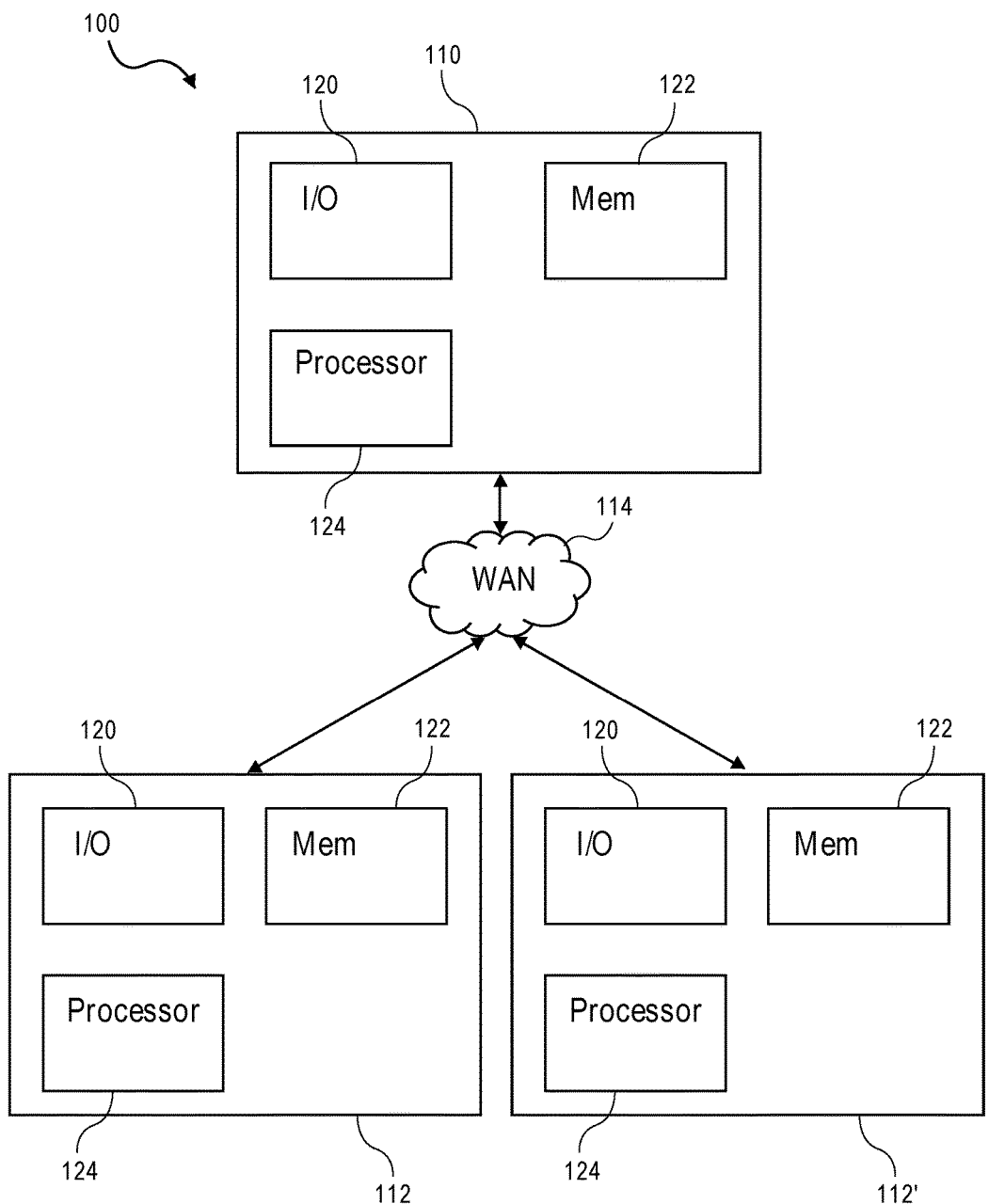

FIG. 8 depicts, in greater detail, another hardware system 100 configured to host an automatic tax data acquisition system 102 according to another embodiment. Like the hardware system 100 depicted in FIG. 6, the hardware system 100 in FIG. 8 includes two server computing devices 112, 112' and a user computing device 110 that are operatively coupled by a network 114. Each server computing device 112, 112' includes an input/output module 120, a memory module 122 and a processor 124, as described above. The user computing device 110 also includes an input/output module 120, a memory module 122 and a processor 124. The processors 124 in the server computing devices 112, 112' and the user computing device 110 are configured to respectively run programs/applications (e.g., the automatic tax data acquisition system 102, the tax return preparation system 108, and the web browser program 118), as shown in FIG. 6.

Figure 9:
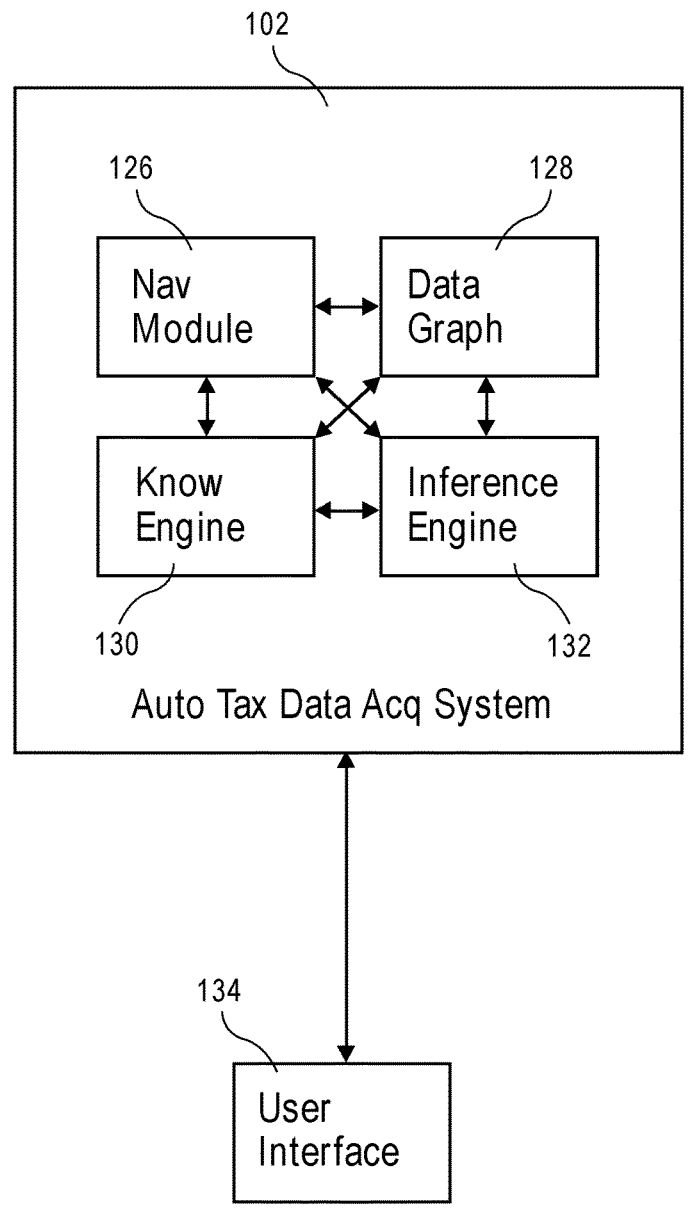
FIG. 9 is a block diagram of an automatic tax data acquisition system according to one embodiment.

FIG. 9 depicts, in greater detail, an automatic tax data acquisition system 102 according to one embodiment. The automatic tax data acquisition system 102 includes a navigation module 126, a data graph 128, a knowledge engine 130, and an inference engine 132. All of these components/modules may be operatively/logically connected elements of the automatic tax data acquisition system 102. FIG. 9 also shows that the automatic tax data acquisition system 102 may be operatively coupled to a user interface 134 (e.g., a user interface 134 of a tax return preparation system 108). While FIG. 9 depicts the automatic tax data acquisition system 102 and the user interface 134 as separate components, in other embodiments, the user interface 134 may be part of the automatic tax data acquisition system 102.

In one embodiment, the data graph 128 may be part of a tax return preparation system 108 running on a user computing device 110. In that embodiment, the data graph 128 forms the user computer portion 104 of the automatic tax data acquisition system 102. The other components of the automatic tax data acquisition system 102 (i.e., the navigation module 126, the knowledge engine 130, and the inference engine 132) form the server portion 106 thereof. In other embodiments, the components of the automatic tax data acquisition system 102 may be distributed between the user computer portion 104 and the server portion 106 thereof in any manner. In still other embodiments (see FIGS. 5 and 6), the components of the automatic tax data acquisition system 102 are hosted by a single computing device and the system 102 does not have different portions.

The navigation module 126 is configured to access a website and obtain user data therefrom. As an example, the website may be for an online banking (credit, checking, savings, etc.) account of the taxpayer. The navigation module 126 may navigate the website, access the user's account (using the taxpayer's authentication information), and obtain user data from the taxpayer's account on the website. Example systems and methods for navigating websites are described in co-owned U.S. patent application Ser. No. 14/810,116, filed on Jul. 27, 2015; Ser. No. 14/871,366, filed on Sep. 30, 2015; and Ser. No. 14/925,633, filed on Oct. 28, 2015, the contents of which are incorporated by reference herein for all purposes as though set forth in full.

The data graph 128 is configured to store and communicate information relating to websites that may include user data and/or tax data. Continuing with the online banking account example from above, the data graph 128 may include navigation instructions for the website (e.g., navigation steps required to access an account holder's 1099-INT form for the current tax year, credits and debits, etc.) In another embodiment, the website may be for payroll account of the taxpayer. In that embodiment, the data graph 128 may include navigation instruction to access an account holder's W-2, pay history, information about changes in pay, information about medical leave, 401K account, etc. The data graph 128 may include information for all websites that may include user data and/or tax data, including websites that are not relevant to the current taxpayer.

The knowledge engine 130 is configured to map data (e.g., user data and tax data) onto a data model. An exemplary data model into which the knowledge engine 130 can map data is the "completion graph" in the tax return preparation system described in co-owned U.S. patent application Ser. No. 14/448,886, filed on Jul. 31, 2014, the contents of which are incorporated by reference herein for all purposes as though set forth in full. The data model/completion graph represents a tax topic/tax legislation/tax rule such that mapping data into certain nodes of (i.e., "running") the data model/completion graph will provide an answer for the taxpayer vis-a-vis the tax topic/tax legislation/tax rule. Some data models/completion graphs can be run by mapping data to more than one path of nodes. The nodes required to run a data model/completion graph varies for each graph. A tax return preparation system 108 can complete a taxpayer's tax return by running a finite set of data models/completion graphs. The knowledge engine 130 can also be configured to validate the mapping of data onto the data model. For instance, the knowledge engine 130 may determine whether the mapped data is the same format as the data model node into which it is mapped. Further, the knowledge engine 130 can be configured to determine whether the data model is complete after mapping the user data onto the data model.

Figure 10:
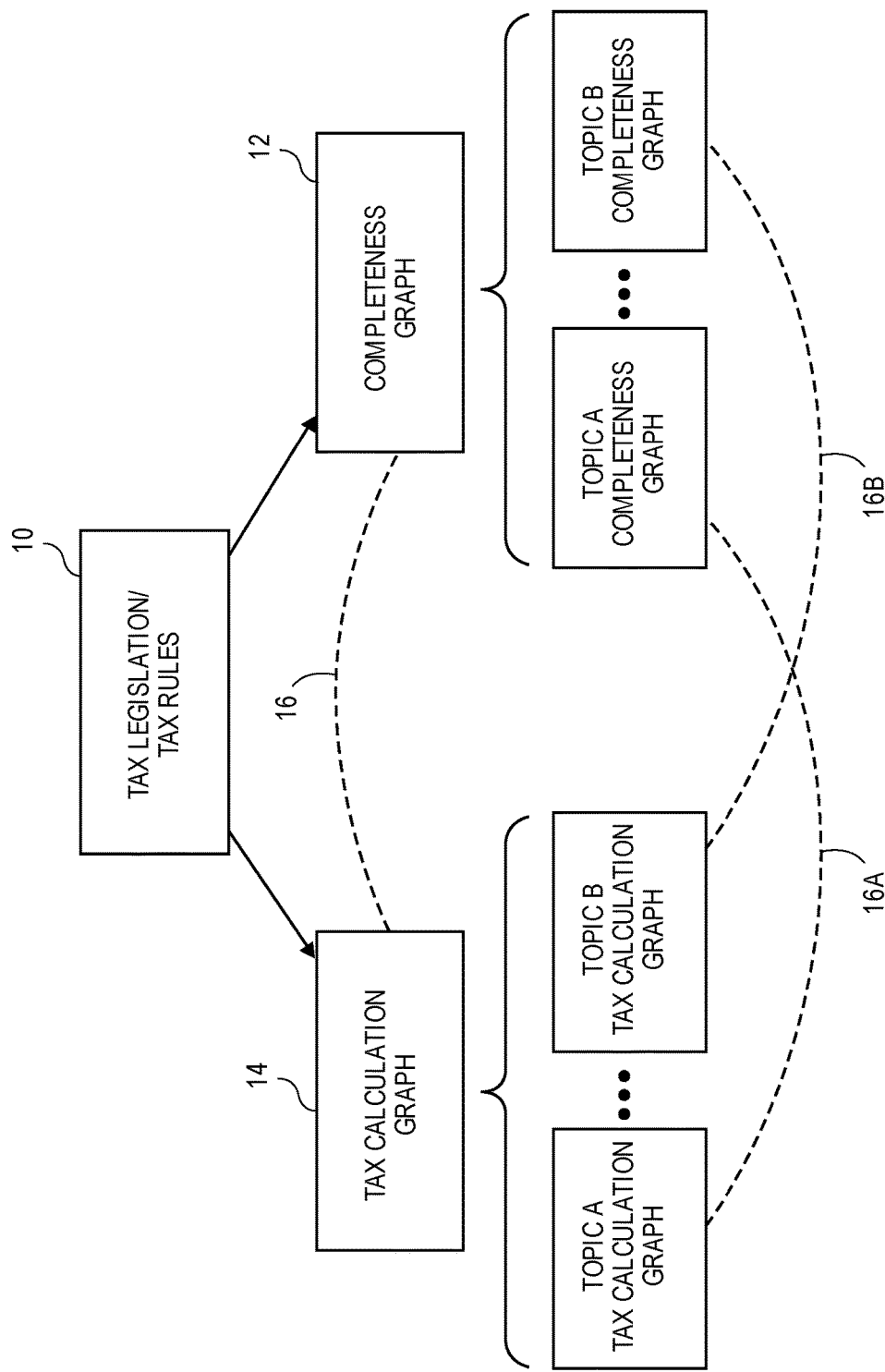
FIG. 10 schematically illustrates how tax legislation/tax rules is/are parsed and represented by a completion graph and a tax calculation graph.

FIG. 10 illustrates graphically how tax legislation/tax rules 10 may be broken down into a completion graph 12 and a tax calculation graph 14 in various tax return preparation systems, such as the one described in U.S. patent application Ser. No. 14/448,886. The tax legislation or rules 10 may be parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, each particular topic (e.g., topics A, B) may each have their own dedicated completion graph 12A, 12B and tax calculation graph 14A, 14B as seen in FIG. 10.

Note that in FIG. 10, the completion graph 12 and the tax calculation graph 14 are interdependent as illustrated by dashed line 16. That is to say, some elements contained within the completion graph 12 are needed to perform actual tax calculations using the tax calculation graph 14. Likewise, aspects within the tax calculation graph 14 may be needed as part of the completion graph 12. Taken collectively, the completion graph 12 and the tax calculation graph 14 may represent data structures that capture all the conditions necessary to complete the computations that are required to complete a tax return that can be filed. The completion graph 12, for example, may determine when all conditions have been satisfied such that a "fileable" tax return can be prepared with the existing data. The completion graph 12 may be used to determine, for example, that no additional data input is needed to prepare and ultimately file a tax return. The completion graph 12 may be used to determine when a particular schema contains sufficient information such a tax return can be prepared and filed. Individual combinations of completeness graphs 12 and tax calculation graphs 14 that relate to one or more topics can be used complete the computations required for some sub-calculation. In the context of a tax setting, for example, a sub-selection of topical completeness graphs 12 and tax calculation graphs 14 can be used for intermediate tax results such as Adjusted Gross Income (AGI) or Taxable Income (TI).

Figure 11:
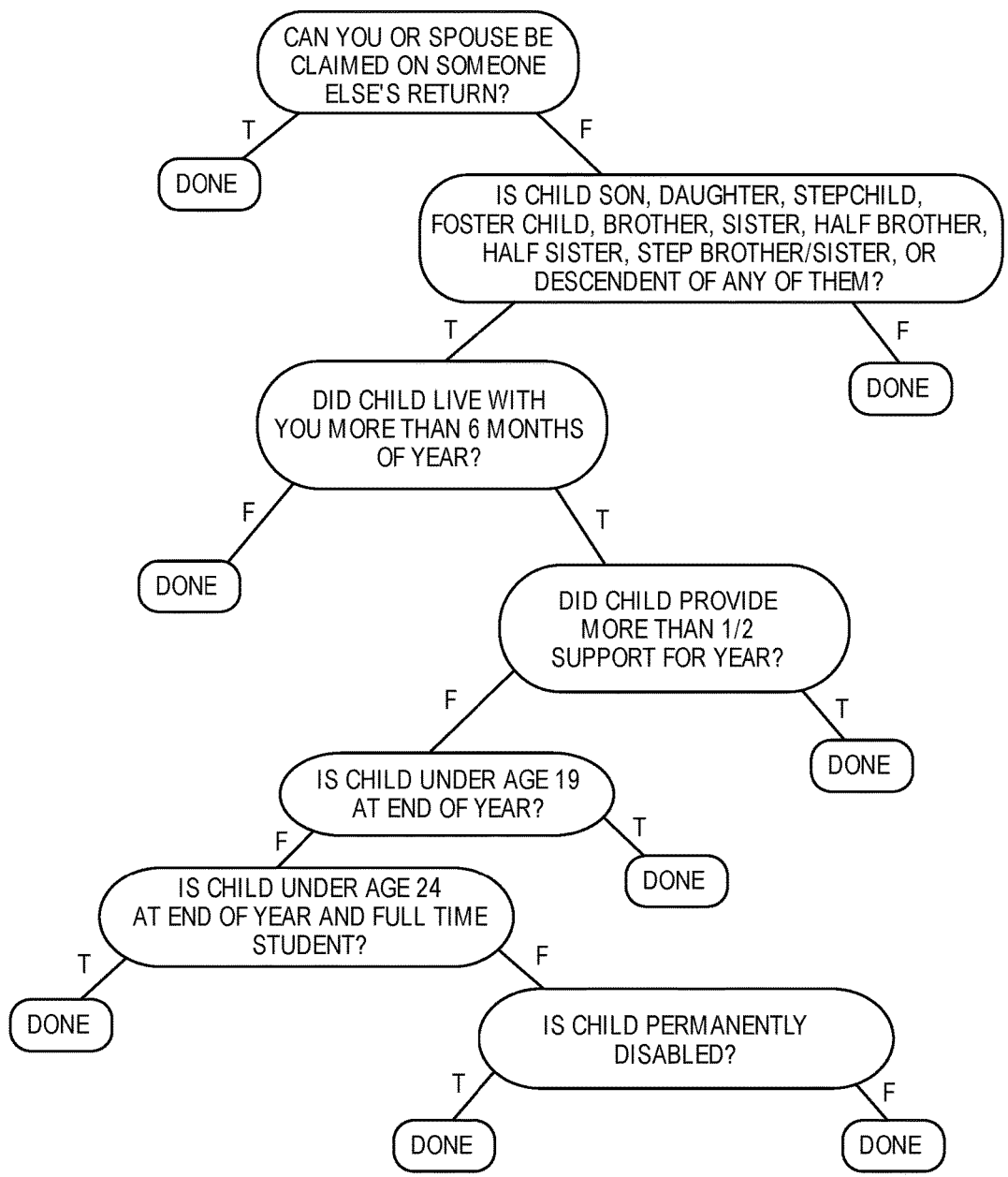
FIG. 11 illustrates an example of a simplified version of a completion graph related to a qualifying child for purposes of determining deductions for federal income tax purposes.

The completion graph 12 and the tax calculation graph 14 represent data structures that can be constructed in the form of a tree. FIG. 11 illustrates a completion graph 12 in the form of a tree with nodes 20 and arcs 22 representing a basic or general version of a completion graph 12 for the topic of determining whether a child qualifies as a dependent for federal income tax purposes. A more complete flow chart-based representation of questions related to determining a "qualified child" may be found in U.S. patent application Ser. No. 14/097,057, the contents of which are fully incorporated herein by reference as though set forth in full. Each node 20 contains a condition that in this example is expressed as a Boolean expression that can be answered in the affirmative or negative. The arcs 22 that connect each node 20 illustrate the dependencies between nodes 20. The combination of arcs 22 in the completion graph 12 illustrates the various pathways to completion. A single arc 22 or combination of arcs 22 that result in a determination of "Done" represent a pathway to completion. As seen in FIG. 11, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

As one can imagine given the complexities and nuances of the tax code, many tax topics may contain completeness graphs 12 that have many nodes with a large number of pathways to completion. However, many branches or lines within the completion graph 12 can be ignored, for example, when certain questions internal to the completion graph 12 are answered that eliminate other nodes 20 and arcs 22 within the completion graph 12. The dependent logic expressed by the completion graph 12 allows one to minimize subsequent questions based on answers given to prior questions. This allows a minimum question set that can be generated that can be presented to a user as explained herein.

Figure 12:
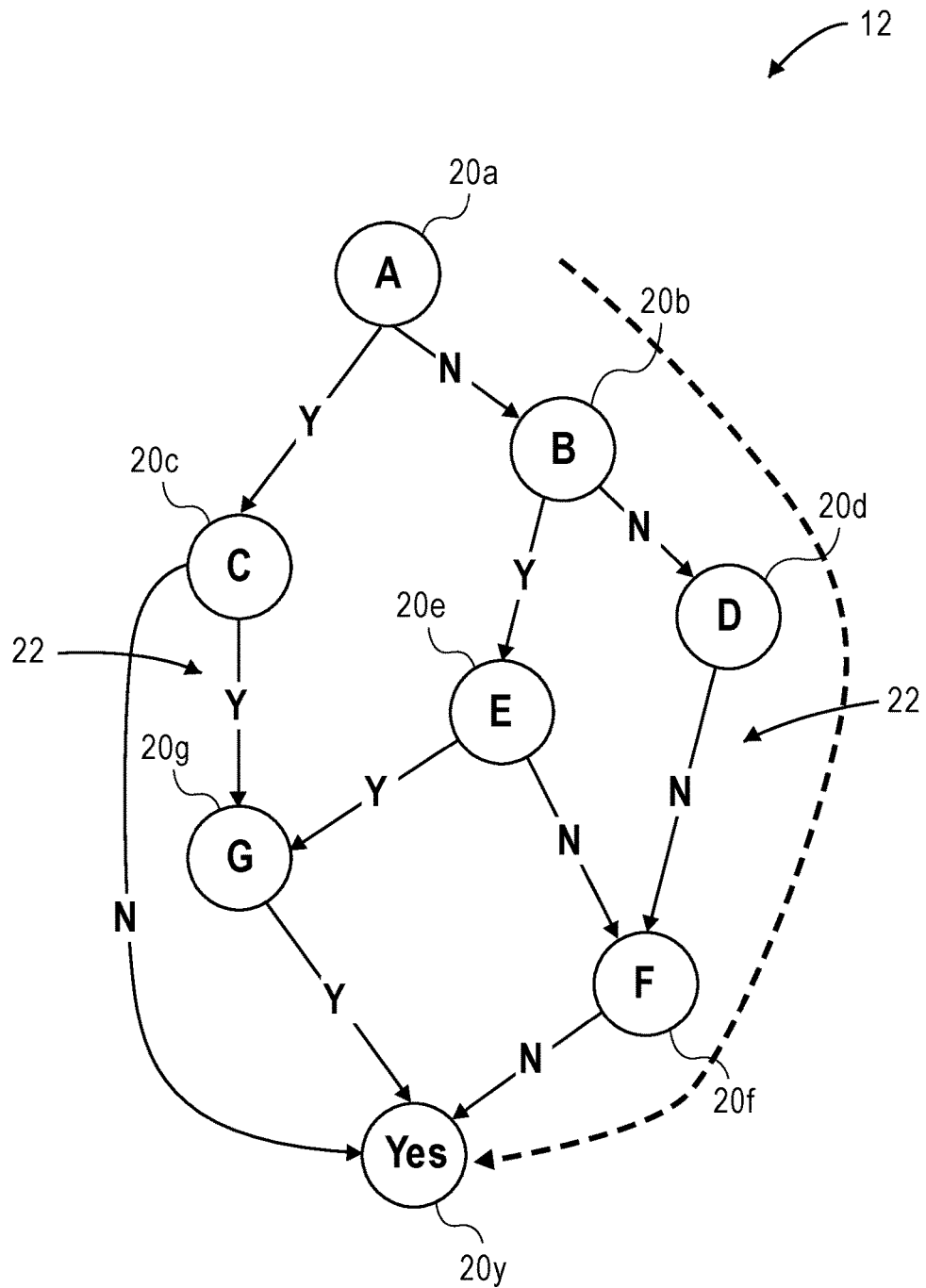
FIG. 12 illustrates another illustration of a completion graph.

FIG. 12 illustrates another example of a completion graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that completion graphs 12 are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 12 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 13, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 12) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 13, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax preparation software 100. In particular, the decision table 30 is used to select a question or questions to present to a user during an interview process. In this particular example, in the context of the completion graph from FIG. 12 converted into the decision table 30 of FIG. 13, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that is irrelevant to the particular pathway to completion. Thus, for example, referring to row 34a, when an answer to QA is "Y" and a path is completed through the completion graph 12 by answering Question C as "N" then answers to the other questions in Nodes B and D-F are "?" since they are not needed to be answered given that particular path.

After in initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions QC and QG in columns 34c, 34g, respectively. One of these questions is selected and the process repeats until either the goal 34h is reached or there is an empty candidate list.

Returning to FIG. 9, the inference engine 132 is configured to analyze the data model after the user data has been mapped thereon, and suggest a system action based on the result of the analysis. The inference engine 132 can also be configured to identify additional user data based on analyzing at least the data model after the user data has been mapped thereon, when the knowledge engine 130 determines that the data model is not complete. For instance, the inference engine 132 can determine that the data model can be completed or run (i.e., provide a tax related answer) by mapping data to one more node. In that case, the inference engine 132 can suggest that system resources be allocated to mapping data to that node. In another embodiment, the inference engine 132 can identify another potential tax data source by analyzing the data model. In that case, the inference engine 132 can suggest that system resources be allocated to accessing that potential tax data source.

The user interface 134 is configured to facilitate communication between the automatic tax data acquisition system 102 and a user. The user interface 134 can be a graphical (e.g., textual) or audio (e.g., voice) interface.

Figure 14:
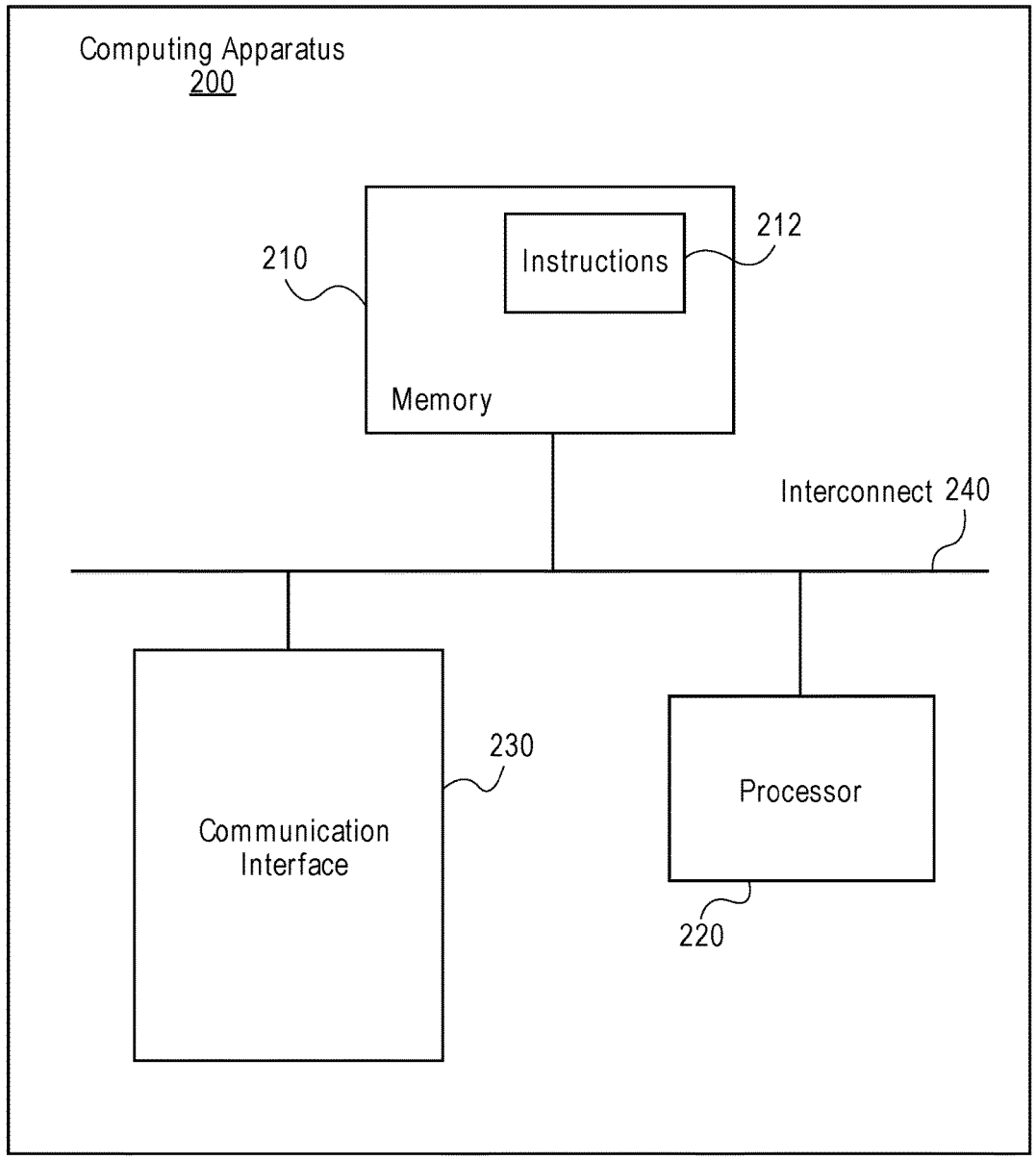
FIG. 14 is a block diagram of a computing apparatus or system in which various embodiments may be implemented or that may be utilized to execute various embodiments.

FIG. 14 generally illustrates certain components of a computing device 200 that may be utilized to execute embodiments and that includes a memory 210, program instructions 212, a processor or controller 220 to execute instructions 212, a network or communications interface 230, e.g., for communications with a network or interconnect 240 between such components. The memory 210 may be or include one or more of cache, RAM, ROM, SRAM, DRAM, RDRAM, EEPROM and other types of volatile or non-volatile memory capable of storing data. The processor unit 220 may be or include multiple processors, a single threaded processor, a multi-threaded processor, a multi-core processor, or other type of processor capable of processing data. Depending on the particular system component (e.g., whether the component is a computing device or a hand held mobile communications device), the interconnect 240 may include a system bus, LDT, PCI, ISA, or other types of buses, and the communications or network interface may, for example, be an Ethernet interface, a Frame Relay interface, or other interface. The network interface 230 may be configured to enable a system component to communicate with other system components across a network which may be a wireless or various other networks. It should be noted that one or more components of computing device 200 may be located remotely and accessed via a network. Accordingly, the system configuration provided in FIG. 14 is provided to generally illustrate how embodiments may be configured and implemented. The processors 124 in the server computing device 112 and the user computing device 110 are programmed with respective automatic tax data acquisition system 102, tax return preparation system 108 and web browser program 112 so that they are no longer generic computing devices.

Having described various aspects of automatic tax data acquisition systems 102 according to various embodiments, computer-implemented methods for obtaining tax data for a tax return preparation program 108 using the automatic tax data acquisition systems 102 will now be described. The methods also include analyzing and modifying a data model (e.g., completion graph), and suggesting system actions.

Figure 15:
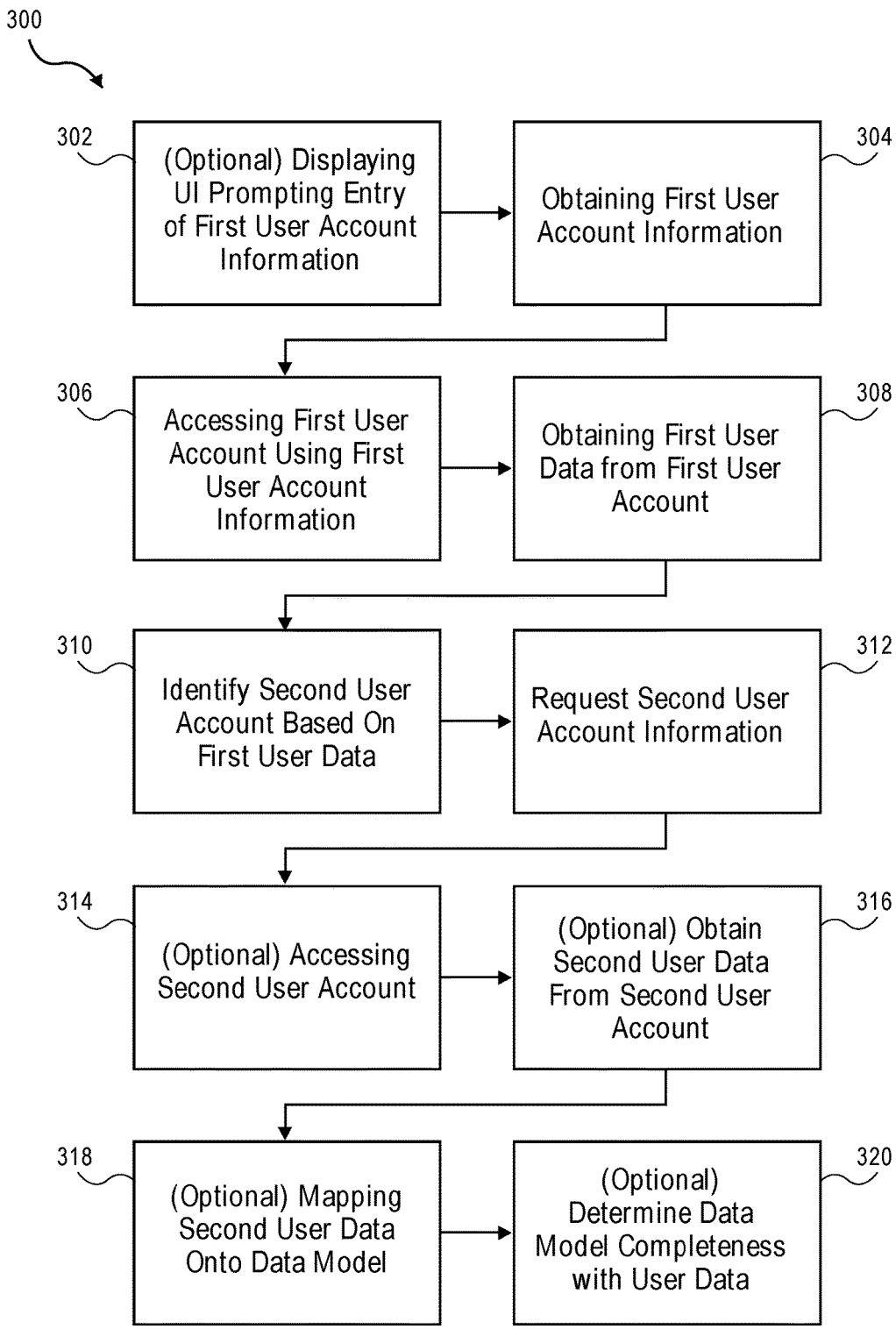
FIGS. 15 and 16 are flow charts depicting computer-implemented methods of acquiring tax data according to various embodiments.

FIG. 15 depicts a computer-implemented method 300 for obtaining tax data for a tax return preparation program according to one embodiment. The method 300 may be implemented using the automatic tax data acquisition systems 102 running on the hardware systems (e.g., 100) depicted in FIGS. 1-8 and 14.

At optional step 302, the automatic tax data acquisition system 102 displays a user interface prompting a user to provide first user account information relating to a first user account. For instance, the first user account information may be authentication (e.g., user name and password) information for the first user account.

The user interface may include information identifying common accounts likely to include tax data. Such accounts includes, but are not limited to, tax accounts, payroll accounts, bank accounts (e.g., savings and checking), credit card accounts, retirement accounts (e.g., 401K and IRA), loan accounts (e.g., home, auto and student), investment accounts, county records (e.g., property tax), and other government accounts (e.g., DMV for vehicle registration). The user interface may also include account providers for each of these account types.

At step 304, the automatic tax data acquisition system 102 (e.g., the navigation module 126) obtains first user account information. In some embodiments, the first user account information is obtained in response to the user interface displayed in step 302. The first user account information may be obtained from the user or from various data repositories to which the user provides access (e.g., by currently or previously authenticating the system 102 to the data repositories). An exemplary data repository is a financial management system such as MINT Financial Management Software, which is available from Intuit Inc. of Mountain View, Calif.

At step 306, the automatic tax data acquisition system 102 (e.g., the navigation module 126) accesses a first user account (e.g., an online banking account) using the first user account information (e.g., authentication information for the online banking account). The navigation module 126 may also use navigation information (e.g., a site map) from a data graph 128 to access the first user account.

At step 308, the automatic tax data acquisition system 102 (e.g., the navigation module 126) obtains first user data from the first user account. For instance, the system 102 may obtain a set of recent credits and debits from the online banking account. The navigation module 126 may also use navigation information (e.g., a site map) from a data graph 128 to obtain the first user data from the first user account.

At step 310, the automatic tax data acquisition system 102 (e.g., the inference engine 132) analyzes the first user data and identifies a second user account based on the results of that analysis. For instance, the inference engine 132 may identify regular payments from a payroll processor relating to a previously unidentified employer in the credits to the online banking account. From these payroll payments, the inference engine 132 may identify the payroll processor account with the previously unidentified employer as a second user account, which may be a tax data source.

At step 312, the automatic tax data acquisition system 102 requests second user account information (e.g., authentication information). The automatic tax data acquisition system 102 may use the user interface 134 to request the information from the user. Alternatively, the automatic tax data acquisition system 102 may request the information from a data repository to which the system 102 has been previously granted access.

At optional step 314, the automatic tax data acquisition system 102 (e.g., the navigation module 126) accesses the second user account (e.g., the payroll account) using the second user account information (e.g., authentication information for the payroll account). The navigation module 126 may also use navigation information (e.g., a site map) from a data graph 128 to access the second user account. Although not shown in FIG. 15, the automatic tax data acquisition system 102 (e.g., the navigation module 126) obtains the second user account information before using the second user account information to access the second user account. The automatic tax data acquisition system 102 (e.g., the navigation module 126) obtains the second user account information in a similar manner to its acquisition of the first user account information described above in step 304.

At optional step 316, the automatic tax data acquisition system 102 (e.g., the navigation module 126) obtains second user data from the second user account. For instance, the system 102 may obtain a W-2 form from the payroll account. The navigation module 126 may also use navigation information (e.g., a site map) from a data graph 128 to obtain the second user data from the second user account.

At optional step 318, the automatic tax data acquisition system 102 (e.g., the knowledge engine 130) maps the second user data onto a data model. The data model may be a tax topic completion graph as described above. The mapping may include extracting income data from the W-2 and importing the income data into an income related node of the completion graph.

At optional step 320, the automatic tax data acquisition system 102 (e.g., the knowledge engine 130) determines whether the data model is complete after mapping the second user data onto the data model. The knowledge engine 130 may run the completion graph after mapping to determine whether the completion graph is completed.

The method 300 depicted in steps 302 to 320 in FIG. 15 automatically identifies a second user account based on information from a first user account and maps second user data from the second use account onto a data model. Iteratively applying the method 300 depicted in FIG. 15 can complete the series of data models required for a tax return preparation system 108 to prepare a user's tax return. Therefore, the automatic tax data acquisition system 102 can identify previously unknown tax data sources with minimal input from the user.

Figure 16:
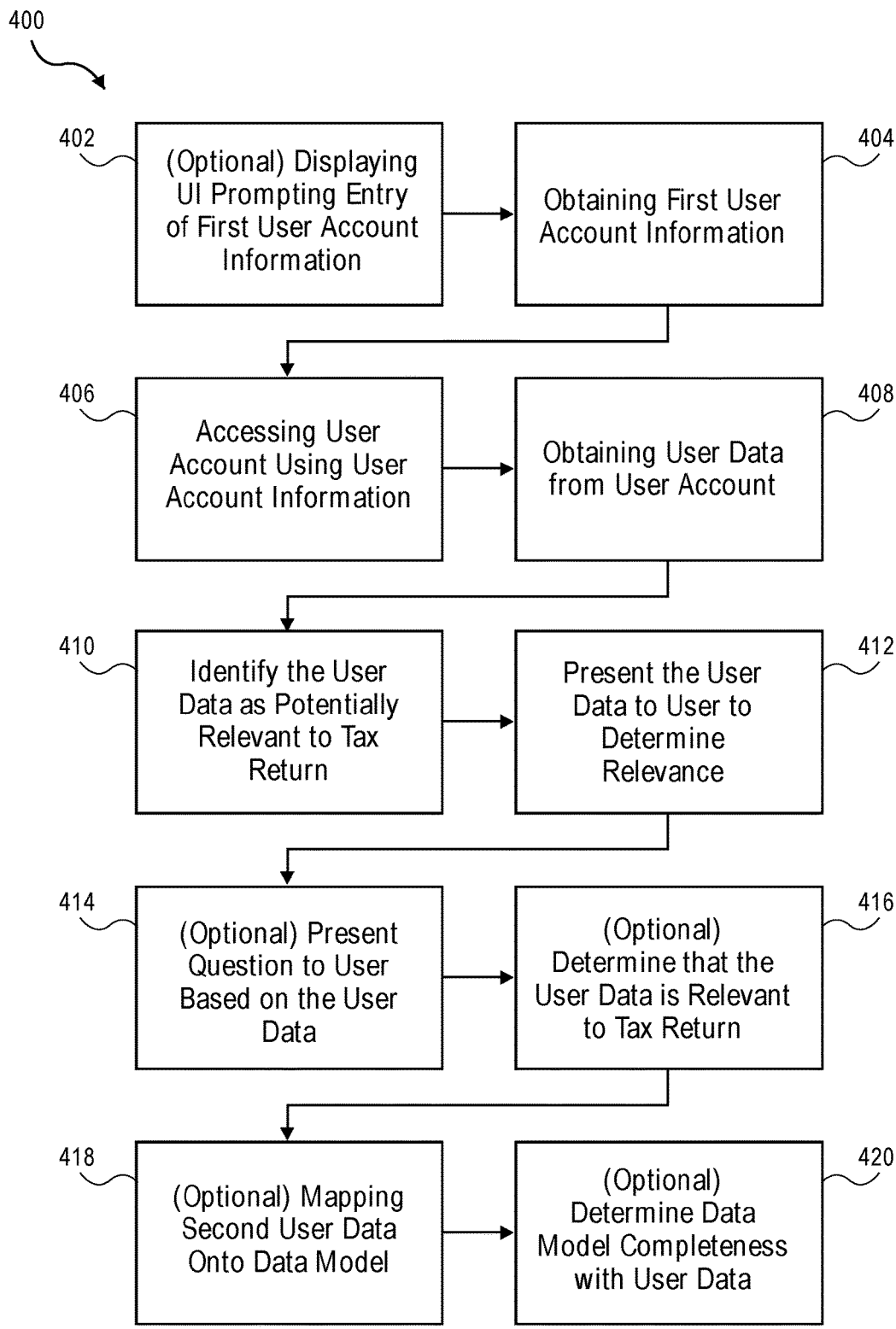

FIG. 16 depicts a computer-implemented method 400 for obtaining tax data for a tax return preparation program according to another embodiment. The method 400 may be implemented using the automatic tax data acquisition systems 102 running on the hardware systems (e.g., 100) depicted in FIGS. 1-8 and 14.

At optional step 402, the automatic tax data acquisition system 102 displays a user interface prompting a user to provide first user account information relating to a first user account. For instance, the first user account information may be authentication (e.g., user name and password) information for the first user account. The user interface may include information identifying common accounts likely to include tax data. Such accounts includes, but are not limited to, tax accounts, payroll accounts, bank accounts (e.g., savings and checking), credit card accounts, retirement accounts (e.g., 401K and IRA), loan accounts (e.g., home, auto and student), investment accounts, county records (e.g., property tax), and other government accounts (e.g., DMV for vehicle registration). The user interface may also include account providers for each of these account types.

At step 404, the automatic tax data acquisition system 102 (e.g., the navigation module 126) obtains first user account information. In some embodiments, the first user account information is obtained in response to the user interface displayed in step 402. The first user account information may be obtained from the user or from various data repositories to which the user provides access (e.g., by currently or previously authenticating the system 102 to the data repositories). An exemplary data repository is a financial management system such as MINT Financial Management Software, which is available from Intuit Inc. of Mountain View, Calif.

At step 406, the automatic tax data acquisition system 102 (e.g., the navigation module 126) accesses a first user account (e.g., an online banking account) using the first user account information (e.g., authentication information for the online banking account). The navigation module 126 may also use navigation information (e.g., a site map) from a data graph 128 to access the first user account.

At step 408, the automatic tax data acquisition system 102 (e.g., the navigation module 126) obtains first user data from the first user account. For instance, the system 102 may obtain a set of recent credits and debits from the online banking account. The navigation module 126 may also use navigation information (e.g., a site map) from a data graph 128 to obtain the first user data from the first user account.

At step 410, the automatic tax data acquisition system 102 (e.g., the inference engine 132) analyzes the first user data and identifies user data as potentially relevant to the user's tax burden based on the results of that analysis. For instance, the inference engine 132 may identify a payment to an accountant in the online banking account debits. This payment to an accountant may be relevant to the user's tax burden because it may qualify as an itemized deduction.

At step 412, the automatic tax data acquisition system 102 presents the user data (e.g., the payment to the accountant) to the user in order to determine the relevance of the user data. The automatic tax data acquisition system 102 may present the user data using the user interface 134.

At optional step 414, the automatic tax data acquisition system 102 presents a question along with the user data (e.g., the payment to the accountant) to the user in order to determine the relevance of the user data. The question may be based on the user data (e.g., "Was this payment to the accountant for income tax preparation?"). The automatic tax data acquisition system 102 may present the question using the user interface 134.

At optional step 416, the automatic tax data acquisition system 102 (e.g., the inference module 132) determines that the user data is relevant to the user's tax burden. For instance, the inference module 132 can determine that the payment to the accountant is relevant because it was for income tax preparation (in response to question presented in step 414).

At optional step 418, the automatic tax data acquisition system 102 (e.g., the knowledge engine 130) maps the user data onto a data model. The data model may be a tax topic completion graph as described above. The mapping may include importing the amount of the payment to the accountant into an itemized deduction related node of the completion graph.

At optional step 420, the automatic tax data acquisition system 102 (e.g., the knowledge engine 130) determines whether the data model is complete after mapping the second user data onto the data model. The knowledge engine 130 may run the completion graph after mapping to determine whether the completion graph is completed.

The method 400 depicted in steps 402 to 420 in FIG. 16 automatically identifies a potentially relevant user data in a user account, determines whether the user data is in fact relevant, and maps the user data onto a data model. Iteratively applying the method 400 depicted in FIG. 16 can complete the series of data models required for a tax return preparation system 108 to prepare a user's tax return. Therefore, the automatic tax data acquisition system 102 can identify previously unknown tax data with minimal input from the user.

FIGS. 17 to 40 depict various exemplary screenshots displayed on the visual display/screen 116 of various user computing devices 110 in the embodiments described above. The screenshots in FIGS. 17 to 40 depict interactions/communications between a user and an automatic tax data acquisition system 102 running along with a tax return preparation system 108 for the purpose of obtaining tax data to prepare a tax return. The communications relate to a scenario in which a user wants to prepare a federal tax return while minimizing data input by analyzing information from user accounts. This saves the user time and effort, while accurately identifying relevant tax data that may have been unknown to the user.

Figure 17:
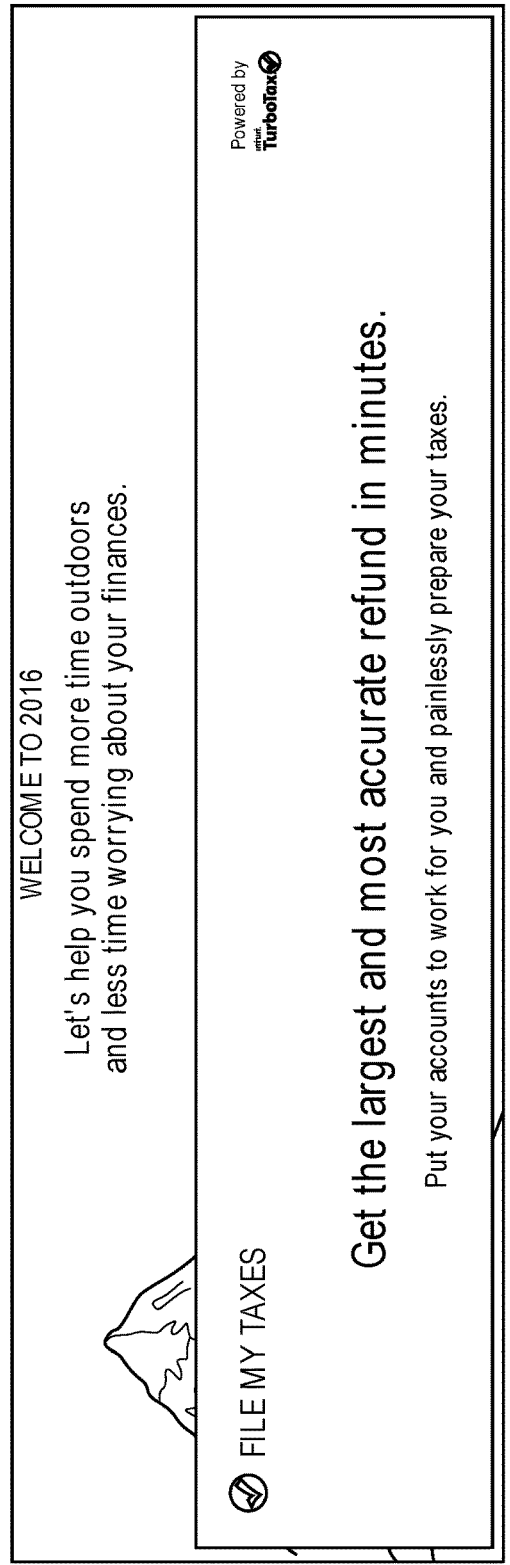

In FIG. 17, the user has started federal income tax preparation for the current tax year. The user may have selected a user interface item (e.g., "File My Taxes") in a previous screen to start this process.

Figure 18:
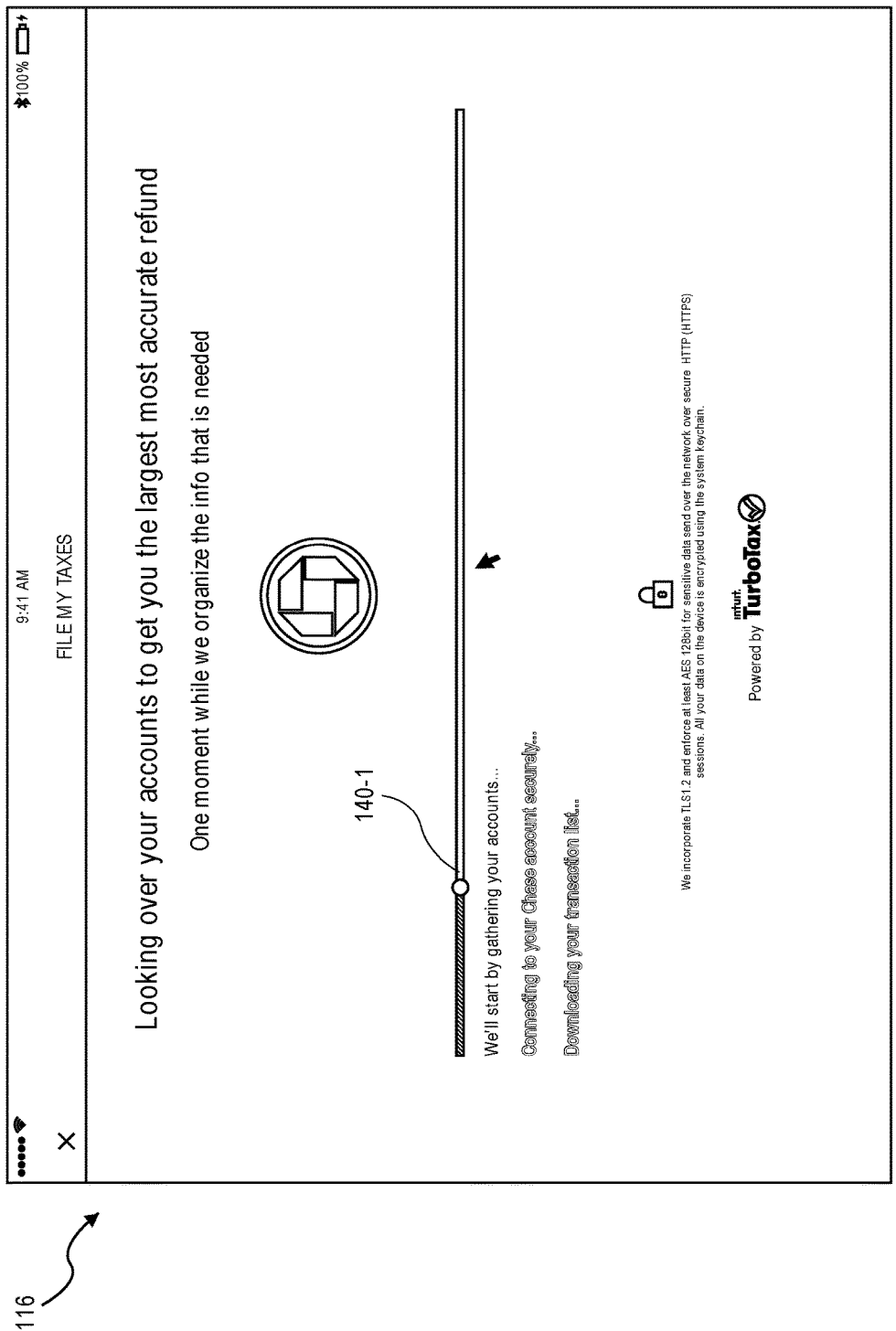

In FIG. 18, the automatic tax data acquisition system 102 is analyzing the user's accounts. The display 116 is showing a user interface object 140-1 (i.e., a progress bar) that tracks the system's 102 analysis of the user's accounts. The display 116 also includes text that explains the system's 102 progress.

Figure 19:
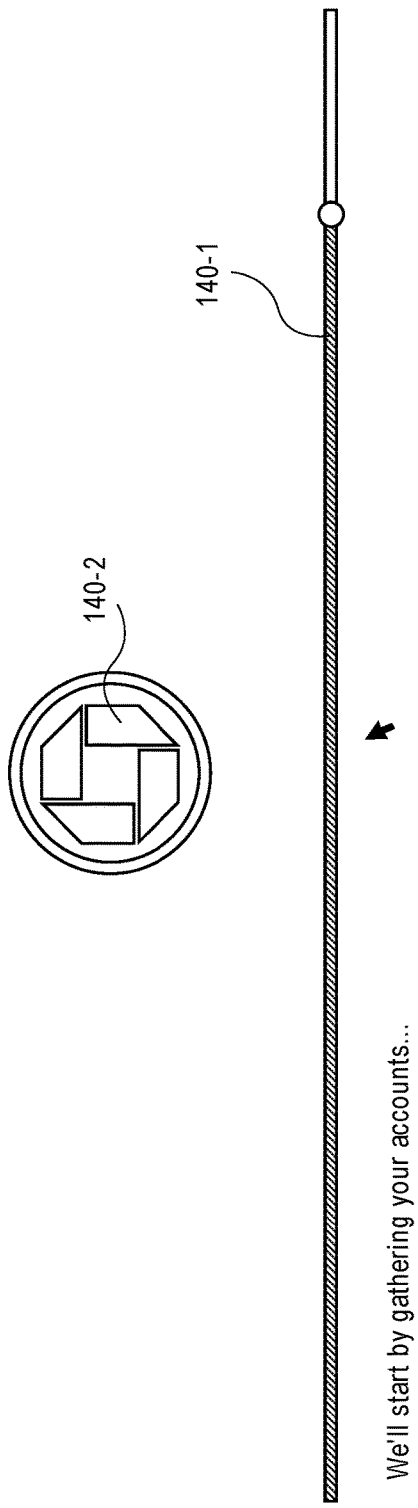

In FIG. 19, the automatic tax data acquisition system 102 is securely accessing the user's online banking account (e.g., "Chase"). The display 116 is showing a user interface object 140-1 (i.e., a progress bar) that tracks the system's 102 analysis of the user's accounts. The display 116 is also showing another user interface object 140-2 that indicates that the system 102 is accessing the online banking account. The display 116 also includes text that explains the system's 102 progress, and that the system is downloading the online banking transaction list.

Figure 20:
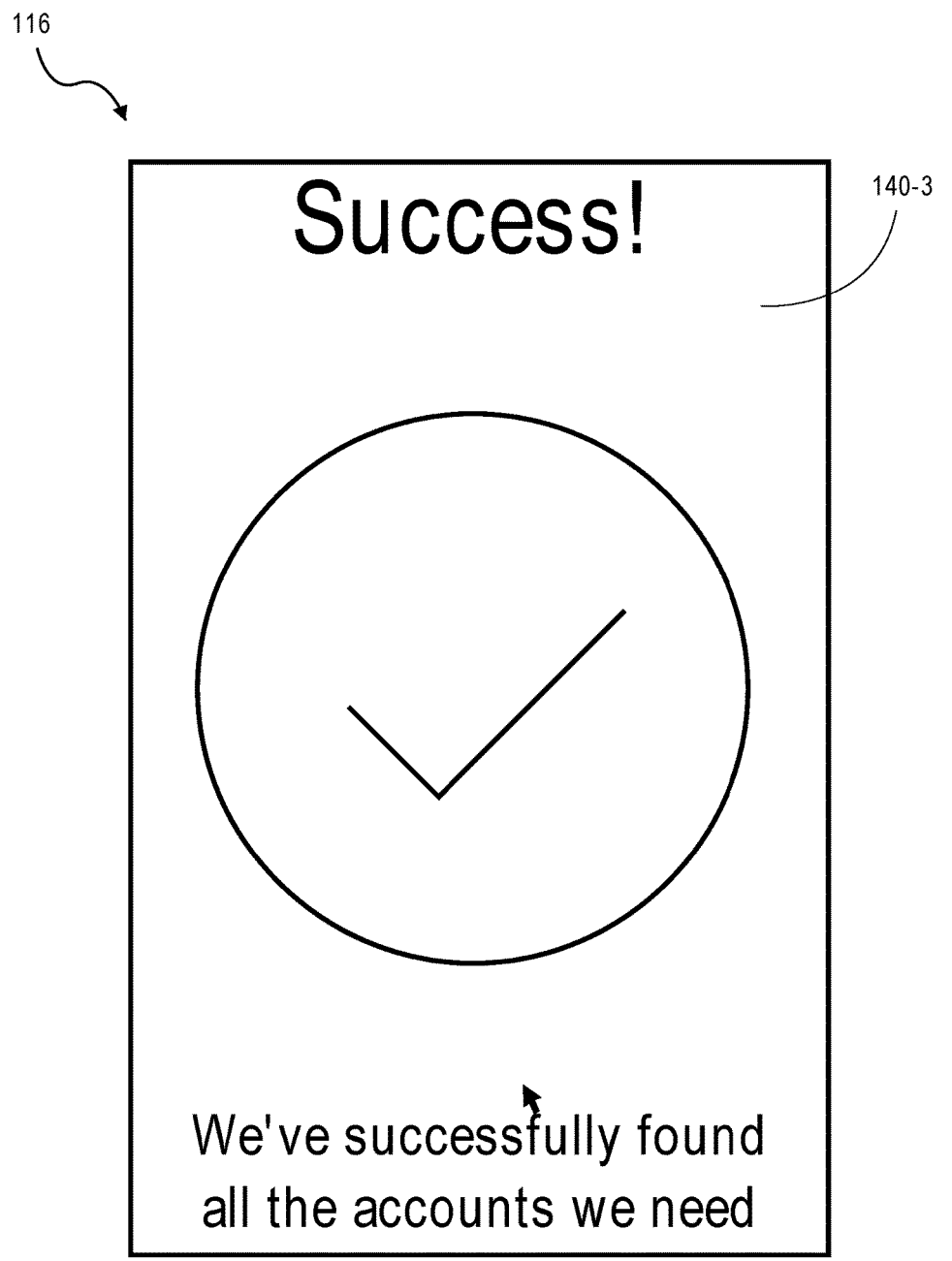

In FIG. 20, the automatic tax data acquisition system 102 has completed accessing the user's accounts. The display 116 is showing a user interface object 140-3 informing the user that the system 102 have found all the accounts it needs.

Figure 21:
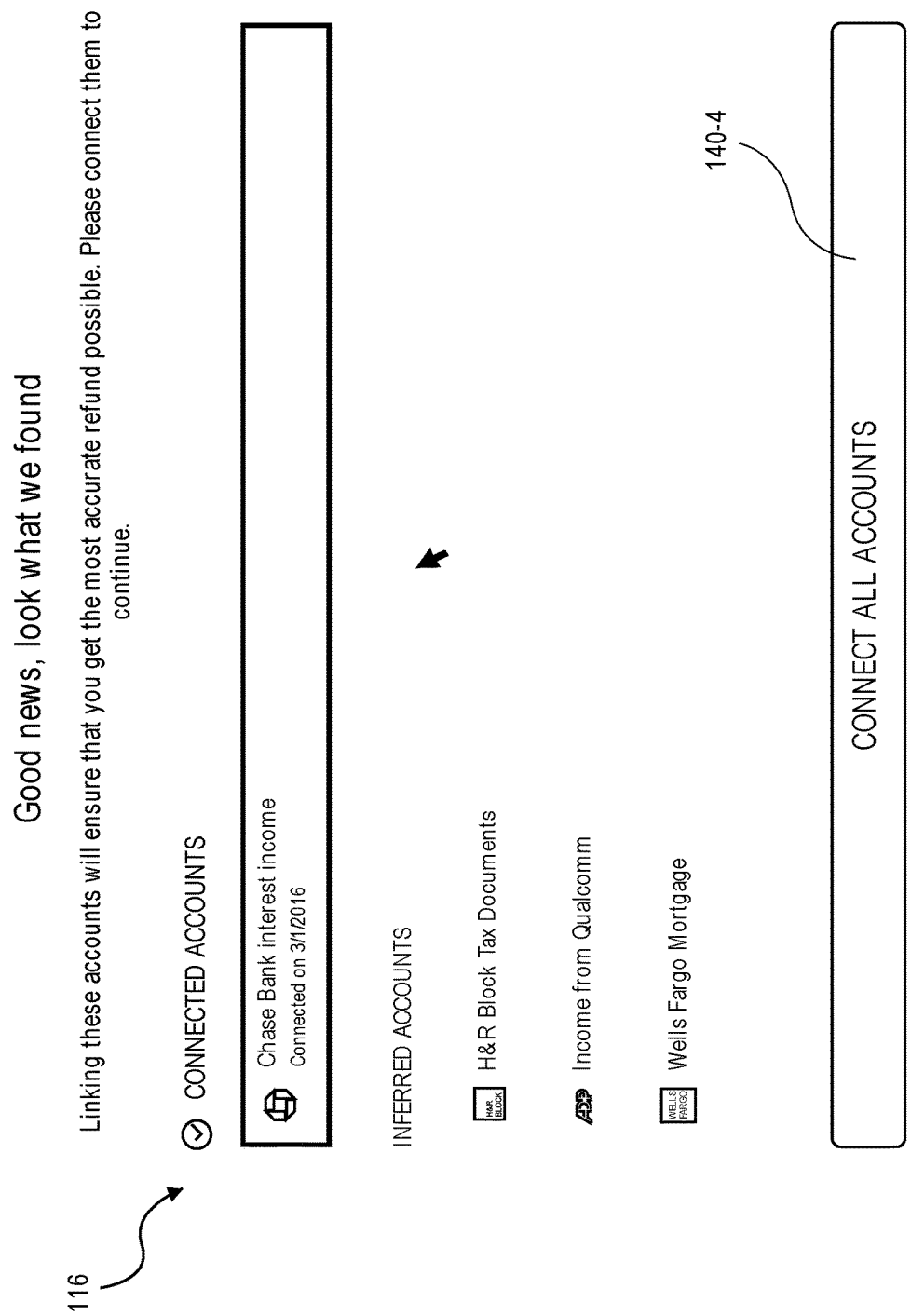

In FIG. 21, the automatic tax data acquisition system 102 has identified several potential tax data sources by analyzing the online banking transaction list. The potential tax data sources are an accountant firm account (e.g., "H&R Block Tax Documents"), a payroll processor account for a specific employer (e.g., "ADP Income from Qualcomm"), and a mortgage account (e.g., "Wells Fargo Mortgage"). The display 116 is showing a list of all the potential tax data sources, and a user interface object 140-4 (e.g., "CONNECT ALL ACCOUNTS") allowing the user to begin the process of linking all of the potential tax data sources.

In FIG. 22, the user has selected the "CONNECT ALL ACCOUNTS" user interface object 140-4 depicted in FIG. 21. In response, the automatic tax data acquisition system 102 is displaying a portion of the transaction list of the online banking account, with the transaction from which the accountant firm account was inferred highlighted. The display 116 is also showing a user interface object 140-5 configured to allow the user to connect the accountant firm account.

Figure 23:
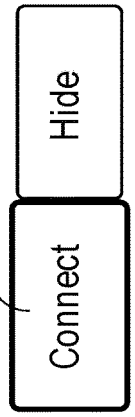

Similar to FIG. 22, in FIG. 23, the automatic tax data acquisition system 102 is displaying a portion of the transaction list of the online banking account, with the transaction from which the payroll processor account for the specific employer was inferred highlighted. The display 116 is also showing a user interface object 140-5 configured to allow the user to connect the payroll processor account.

Figure 24:

In FIG. 24, the automatic tax data acquisition system 102 has imported two items from the mortgage account identified in FIG. 21. The display 116 is showing that the 2014 mortgage interest 1098E form and the 2015 December mortgage bill have been obtained from the mortgage account.

In FIG. 25, the automatic tax data acquisition system 102 is informing the user that all of the accounts identified (from the online banking account) in FIG. 21 can be connected with the selection of one user interface object.

Figure 26:
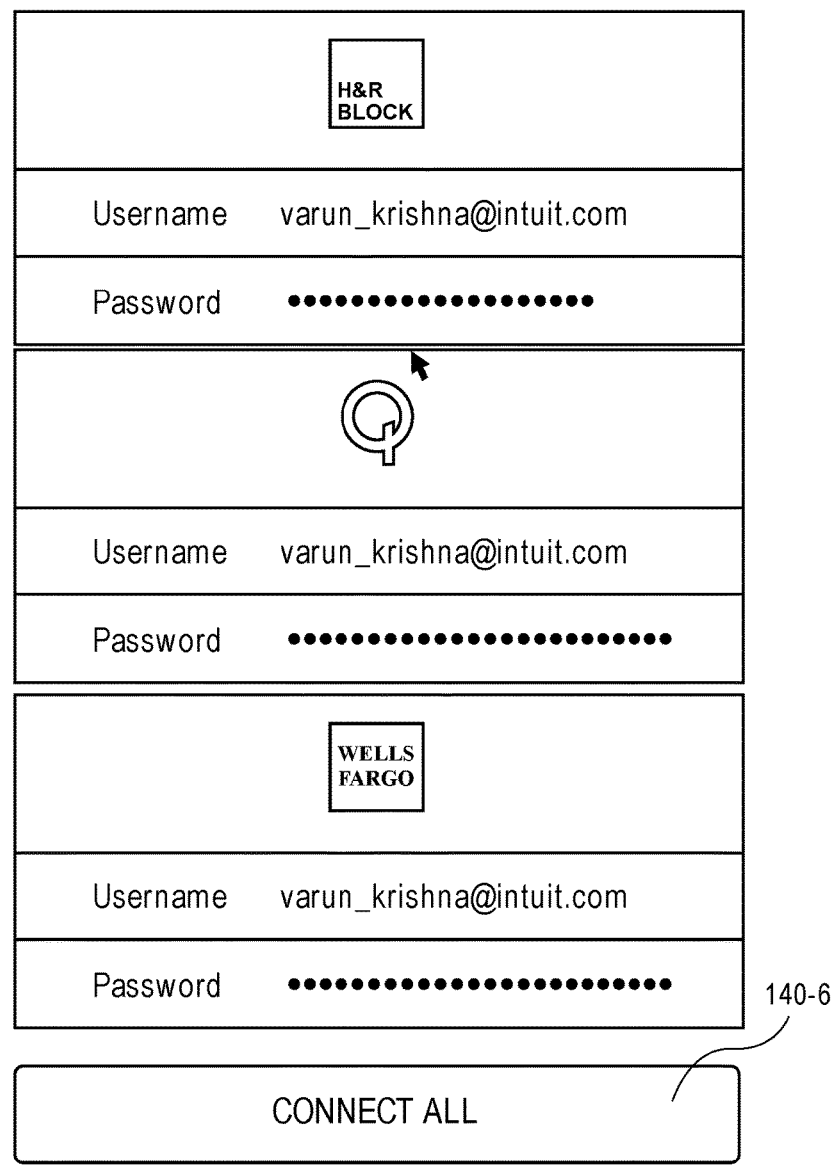

In FIG. 26, which is related to the "connect with one tap" scenario in FIG. 25, the automatic tax data acquisition system 102 has listed all of the accounts identified (from the online banking account) in FIG. 21. In addition, the display 116 is showing a username and a password for each account. This authentication information may have been retrieved from a data repository (e.g., a financial management system), or the automatic tax data acquisition system 102 may have requested that the user enter the authentication for the accounts. Alternatively, the automatic tax data acquisition system 102 may have prefilled the username and password using a username and a password that the user uses for multiple accounts. In that embodiment, the user may correct the username and password before proceeding. The display 116 also includes a user interface object 140-6 configured to connect the accounts using the authentication information.

Figure 27:
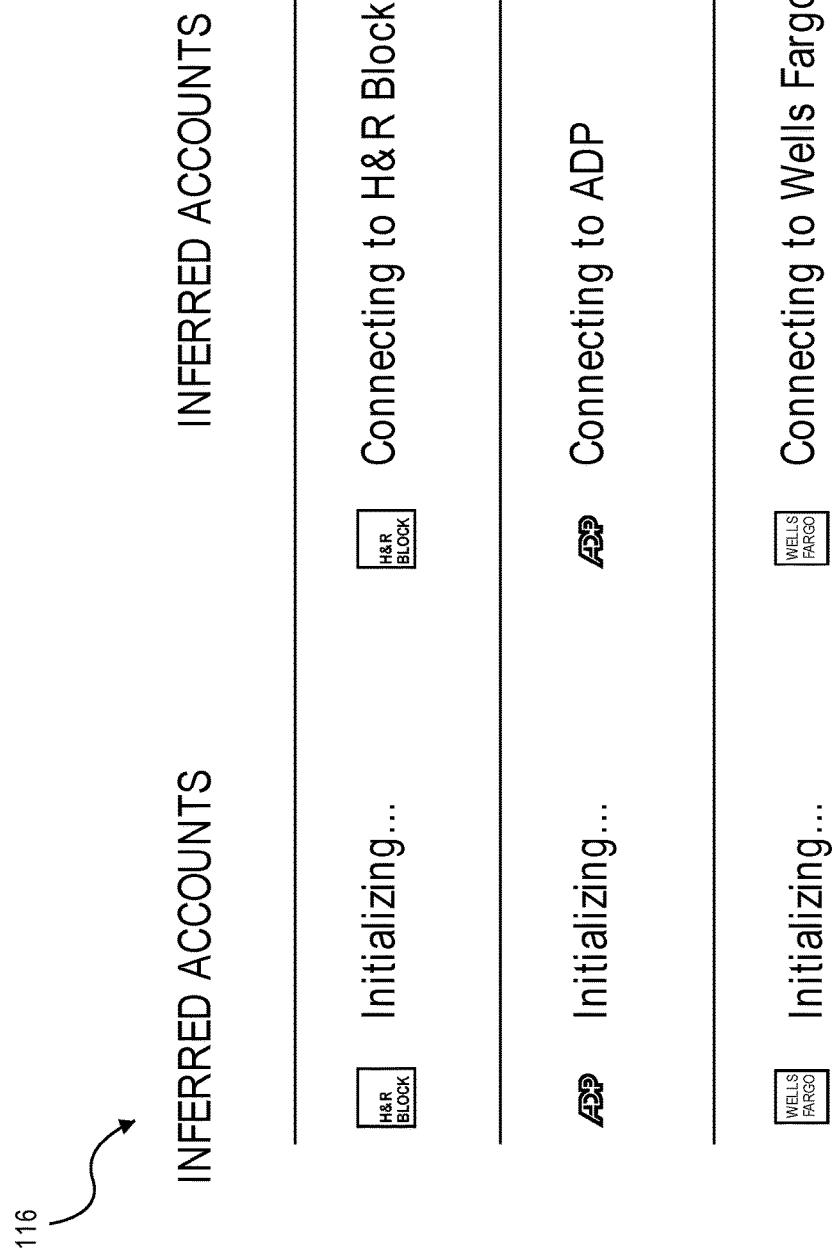
Figure 29:

In FIGS. 27-29, the automatic tax data acquisition system 102 is connecting to all of the accounts identified (from the online banking account) in FIG. 21 and for which authentication information was listed in FIG. 26. The displays 116 in FIGS. 27-29 show different text tracking the progress of the connection and data extraction. Because connection and data extraction can be a long process (especially with many accounts), the displays 116 in FIGS. 27-29 assure a user that the automatic tax data acquisition process is proceeding smoothly. Some exemplary messages are "Initializing," "Connecting to," "Encrypting your credentials," "Establishing secure link," "Fetching your documents," and "Extracting information." The automatic tax data acquisition system 102 can extract information from documents using Optical Character Recognition.

In FIG. 30, the automatic tax data acquisition system 102 lists all of the user data obtained from connected accounts. The system 102 obtained interest income from the online banking account. The system 102 also obtained a 2014 1040A and a 2013 1040EZ from the accountant firm account. The system 102 further obtained a 2014 W2 and a 2015 PayStub from the payroll processor account for the specific employer. Moreover, the system 102 obtained a 2014 mortgage interest 1098E form and a 2015 December mortgage bill from the mortgage account.

Figure 31:
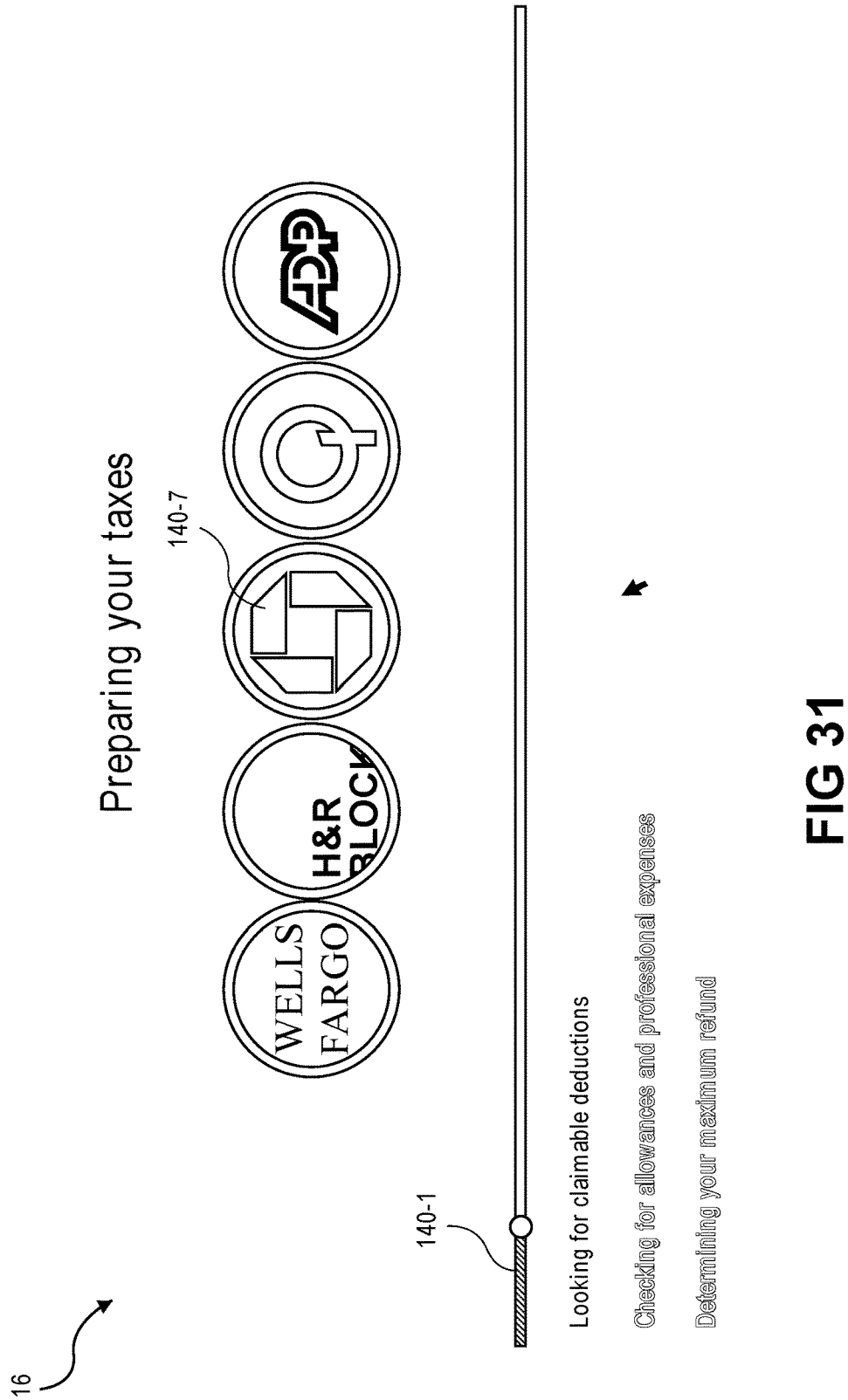
Figure 32:
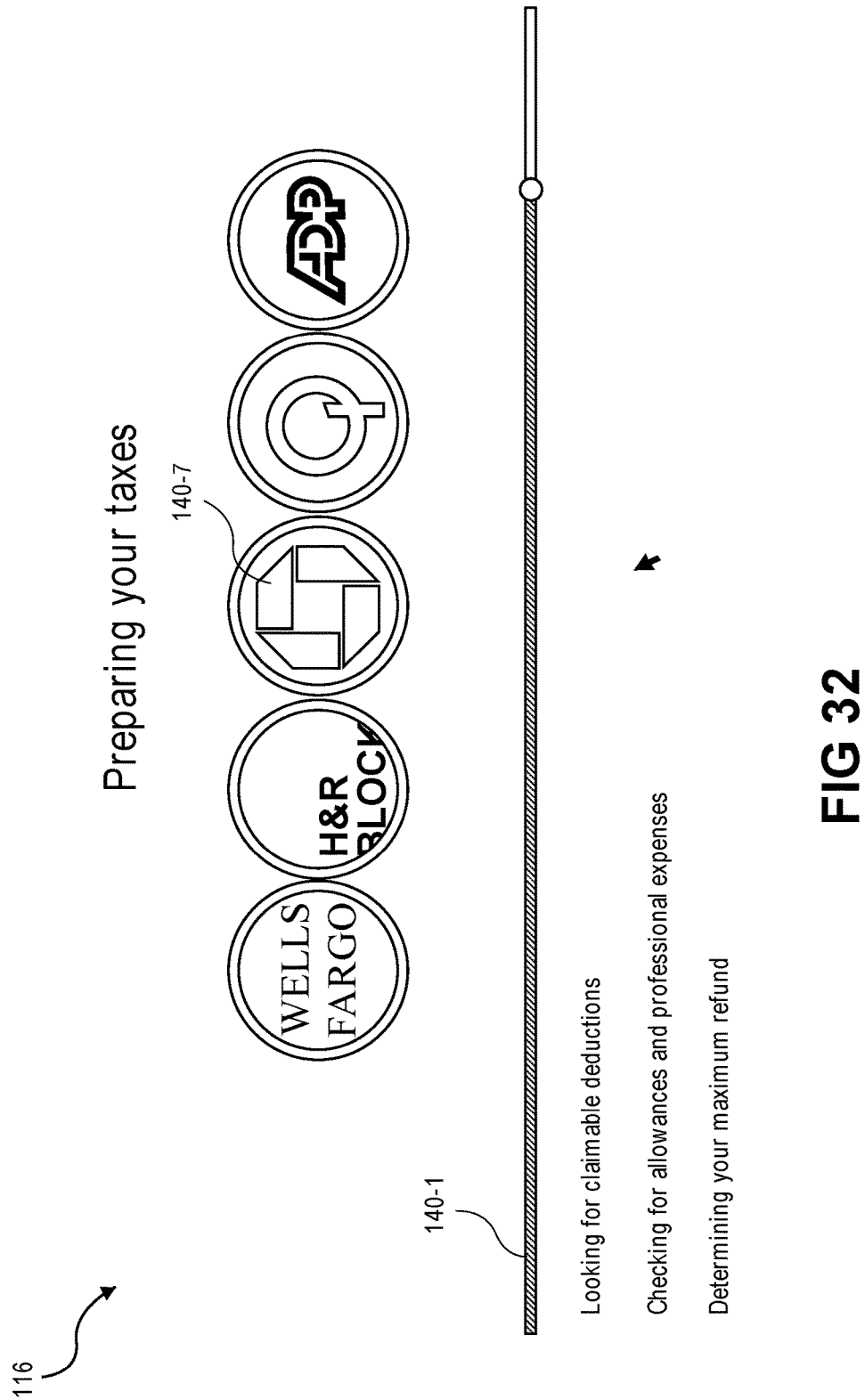

In FIGS. 31 and 32, the tax return preparation system 108 is preparing the taxpayer's income tax return using the user data obtained from the accounts acquired by the automatic tax data acquisition system 102, as summarized in FIG. 30. The display 116 is showing a user interface object 140-1 (i.e., a progress bar) that tracks the system's 108 preparation of the tax return. The display 116 also includes text that explains the system's 108 progress. The display 116 further includes icons 116-7 identifying the accounts from which user data was obtained.

Figure 33:
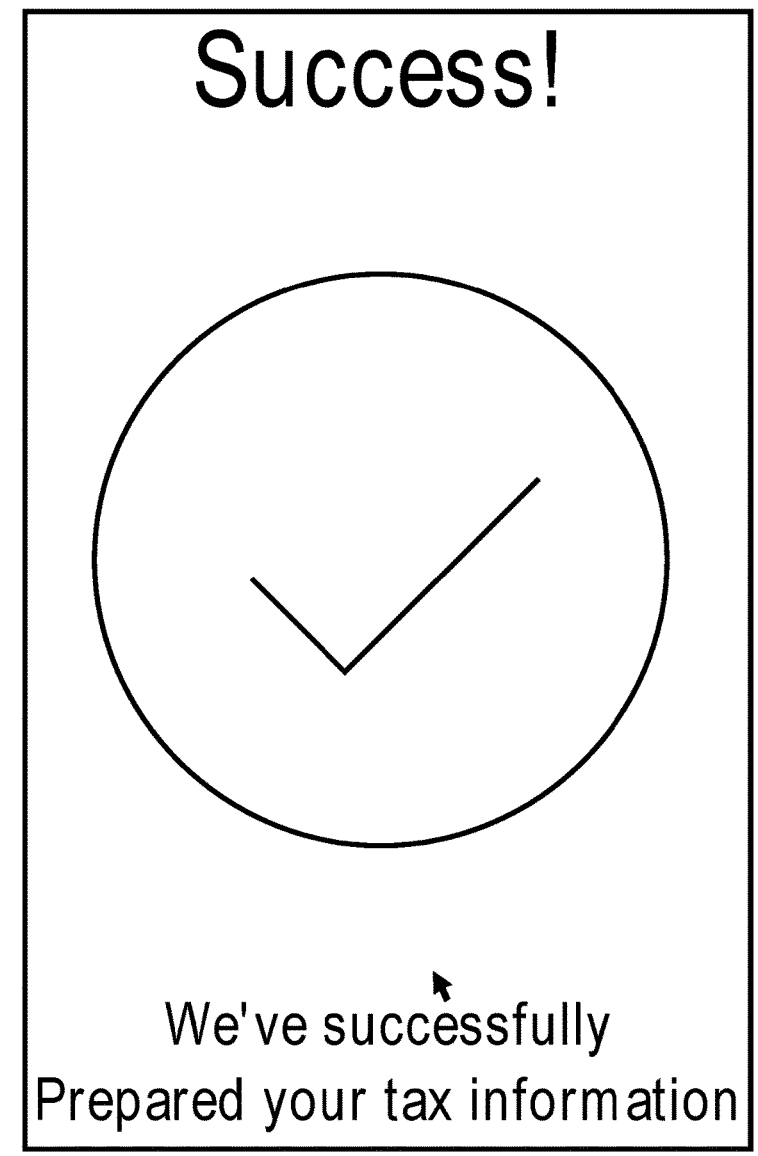

In FIG. 33, the tax return preparation system 108 has completed preparing the taxpayer's tax return using user data acquired by the automatic tax data acquisition system 102. The display 116 is showing a message informing the user that the tax return has been successfully prepared the automatic tax data acquisition system 102.

Figure 34:

In FIG. 34, the tax return preparation system 108 is awaiting authorization for file the prepared tax return. The display 116 is showing a summary of the results of the tax return (e.g., a refund of $2,234). The display 116 also includes a user interface object 140-8 configured to authorize filing of the prepared tax return.

Figure 35:
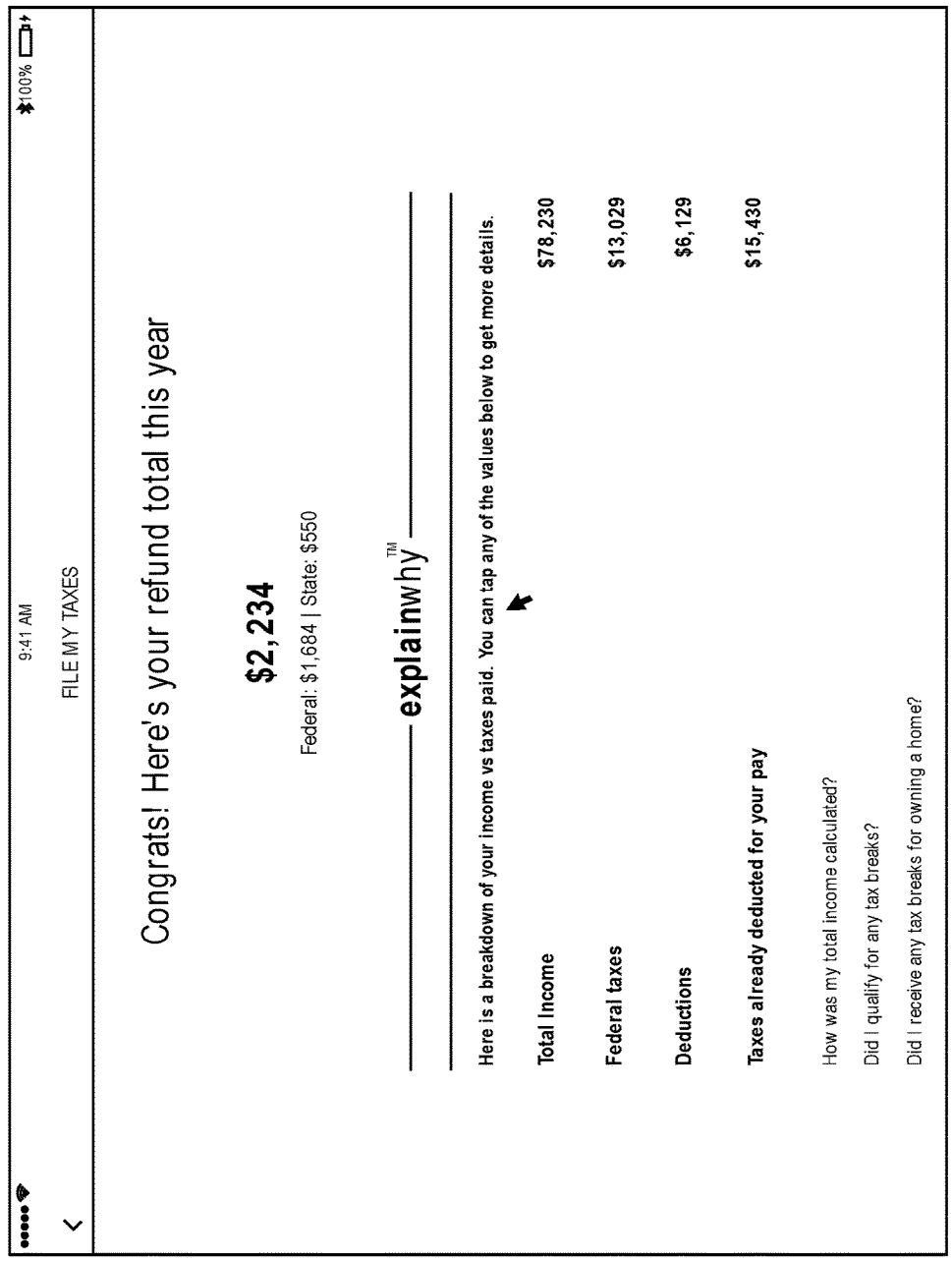

In FIG. 35, the tax return preparation system 108 is explaining the result of the tax return. The display 116 is showing a breakdown of income, federal taxes, and deductions. Each of these categories is selectable for a more detailed breakdown of the respective category. This page addresses the desire of some preparers and taxpayers to understand their tax burden on a more granular level.

Figure 36:
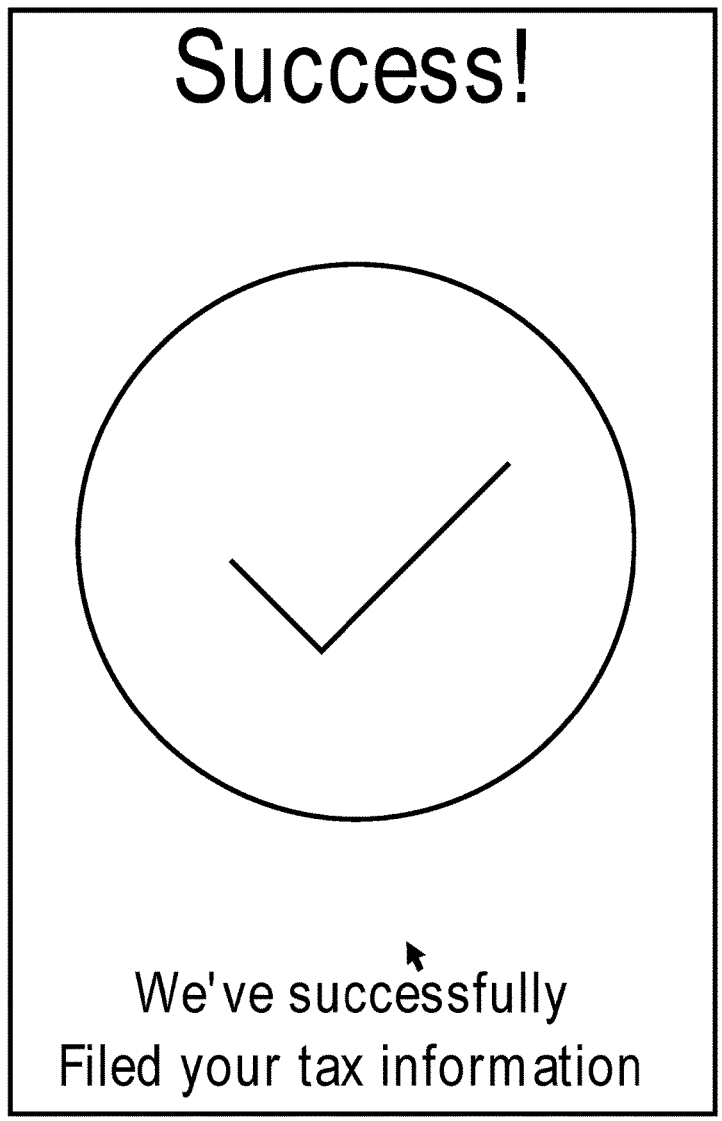

In FIG. 36, the tax return preparation system 108 has filed the prepared tax return. The display 116 is showing a message informing the user that the tax return has been successfully filed.

Figure 37:
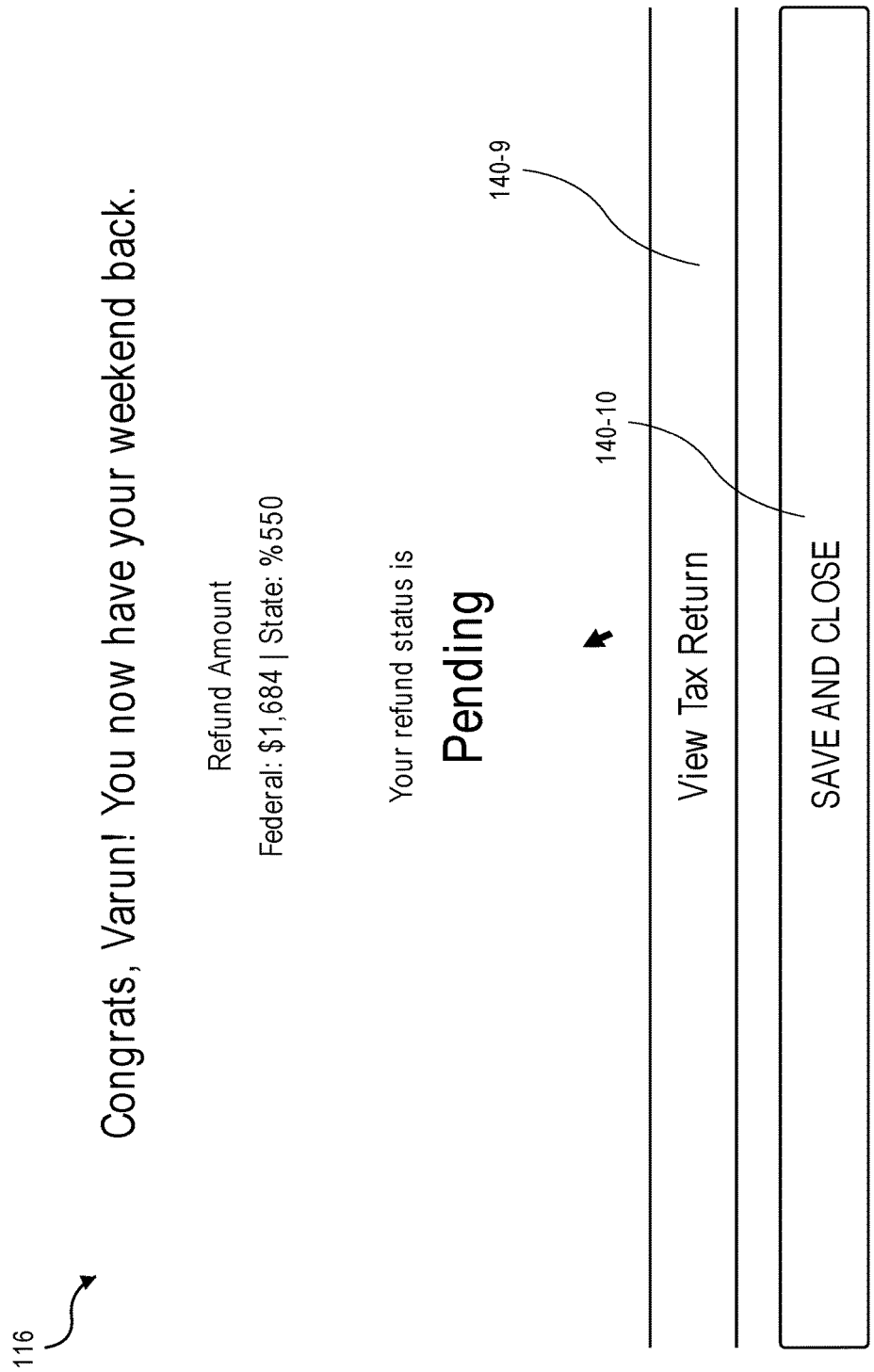

In FIG. 37, the tax return preparation system 108 has filed the prepared tax return. The display 116 is showing a summary regarding the tax return, including its "Pending" status. The display 116 also includes two user interface objects 140-9, 140-10 configured to allow the user to view the tax return (140-9) and save the tax return (140-10).

In FIG. 38, the automatic tax data acquisition system 102 is building a profile for a taxpayer. The display 116 is showing fields for "My Accounts," "Personal Info," and "Documents." The user can enter tax relevant information for the taxpayer into the respective fields.

In FIG. 39, the automatic tax data acquisition system 102 is summarizing the accounts in a taxpayer's profile. These accounts include payroll processors ("ADP"), tax preparers ("TurboTax"), mortgage accounts ("Wells Fargo Home Mortgage"), social network accounts ("LinkedIn" and "Facebook"), and online banking ("Chase").

In FIG. 40, the automatic tax data acquisition system 102 is obtaining authentication information for an online banking account. The display 116 includes user interface objects 140-11 that allow a user to provide a user name and a password for the online banking account.

Although the exemplary scenario depicted in FIGS. 17-40 involved analysis of transactions in an online banking account, the automatic tax data acquisition system 102 can also analyze user data from other user accounts. For instance, the system may identify an accountant/tax preparer from a user's social media account if the user "liked" the accountant/tax preparer or if the user wrote a review of the accountant/tax preparer.

Although the three exemplary scenarios depicted in FIGS. 17-40 resulted in a completed tax return, the automatic tax data acquisition system 102 can also reach a point where it needs more information from the user to complete the tax return. In such situations, the system 102 will enter a semi-automatic mode and see input from the user. However, the system 102 can efficiently minimize and organize the questions for the user by extracting all of the tax data possible from the taxpayer's accounts and eliminating questions that are no longer needed or relevant to the taxpayer's tax return. This will reduce the time and effect cost of preparing tax returns while maximizing the accuracy of those returns by identifying previously unknown tax data sources.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 220 performs steps or executes program instructions 212 within memory 210 and/or embodied on the carrier to implement method embodiments.

Although particular embodiments have been shown and described, it should be understood that the above discussion is not intended to limit the scope of these embodiments. While embodiments and variations of the many aspects of embodiments have been disclosed and described herein, such disclosure is provided for purposes of explanation and illustration only. Thus, various changes and modifications may be made without departing from the scope of the claims.

For example, while certain embodiments have been described with reference to simplified completion graph analysis, completion graphs can be substantially more complex such that more complicated analyses can be utilized therewith. Completion graph analysis is not available in known tax data acquisition systems.

The system and method embodiments described herein improve the functioning of a computer by improving its communication with a user (i.e., a more efficient user interface for tax data acquisition). The system and method embodiments described herein also transform account data into tax data and finally into a completed and filed tax return.

Where methods and steps described above indicate certain events occurring in certain order, those of ordinary skill in the art having the benefit of this disclosure would recognize that the ordering of certain steps may be modified and that such modifications are in accordance with the variations of the disclosed embodiments. Additionally, certain of the steps may be performed concurrently in a parallel process as well as performed sequentially. Thus, the methods shown in various flow diagrams are not intended to be limited to a particular sequential order, unless otherwise stated or required.

Accordingly, embodiments are intended to exemplify alternatives, modifications, and equivalents that may fall within the scope of the claims.

What is claimed is:

1. A computing system for obtaining tax data, the system comprising:
   one or more processors; and
   one or more computer-readable storage devices storing computer-executable instructions, the instructions operable to cause the one or more processors to:
      access a user account using user account information from at least one remote source over the network;
      obtain user data from the user account;
      map the user data onto one or more nodes of a data graph of a data model;
      analyze the data model including the mapped user data to identify additional user data for completing the data graph; and
      suggest a system action including providing navigation information to obtain the additional user data from at least one remote source over the network.

2. The system of claim 1, wherein the user data comprises tax data.

3. The system of claim 1, wherein the information comprises a data format, a data label, a data category, and/or a data mapping instruction.

4. The system of claim 1, wherein the instructions are further operable to cause the one or more processors to validate mapping of the user data onto the data model.

5. The system of claim 1, wherein the instructions are further operable to cause the one or more processors to determine whether the data model is complete after mapping the user data onto the data model.

6. The system of claim 5, wherein the instructions are further operable to cause the one or more processors to identify additional user data based on analyzing at least the data model after the user data has been mapped thereon, in response to determining that the data model is not complete.

7. The system of claim 6, wherein the system action comprises obtaining additional user data using the navigation information to access at least one remote source.

8. The system of claim 1, wherein the data graph of the data model comprises information for a plurality of websites that include user data.

9. The system of claim 1, wherein the instructions are further operable to cause the one or more processors to display a user interface on the second computing device and prompt the user to provide the user account information.

10. The system of claim 9, wherein the user interface includes information identifying a plurality of accounts associated with the user.

11. The system of claim 1, wherein the user account information is selected from the group consisting of a user account website, a user account identification, and a user account password.

12. The system of claim 1, wherein the instructions are further operable to cause the one or more processors to identify at least one additional account based on analysis of the user data, and request additional user account information related to the additional user account.

13. The system of claim 1, wherein the instructions are further operable to cause the one or more processors to access the additional user account to obtain the additional user data from at least one remote source over the network.

14. The system of claim 1, wherein the instructions are further operable to cause the one or more processors to:
map additional user data onto one or more nodes of the data graph of the data mode; and
determine whether the data model is complete after mapping the additional user data onto the data model.

15. The system of claim 1, wherein the instructions are further operable to cause the one or more processors to determine whether the mapped additional data is the same format as the data model node into which it is mapped.

16. A method performed in a computing system, the computing system comprising one or more processors and one or more computer-readable storage devices storing computer-executable computer instructions, the method comprising executing the instructions thereby causing the one or more processors to:
access a user account using user account information from at least one remote source over the network;
obtain user data from the user account;
map the user data onto one or more nodes of a data graph of a data model;
analyze the data model including the mapped user data to identify additional user data for completing the data graph; and
suggest a system action including providing navigation information to obtain the additional user data from at least one remote source over the network.

17. The method of claim 16, wherein the one or more processors are configured to determine whether the data model is complete after mapping the user data onto the data model.

18. The method of claim 17, wherein the one or more processors are configured to identify additional user data based on analyzing at least the data model after the user data has been mapped thereon, in response to determining that the data model is not complete.

19. The method of claim 17, wherein the one or more processors are configured to identify at least one additional account based on analysis of the user data; and request additional user account information related to the additional user account.

20. The method of claim 19, wherein the one or more processors are configured to access the additional user account to obtain the additional user data from at least one remote source over the network.

21. The method of claim 20, wherein the one or more processors are configured to:
map additional user data onto one or more nodes of the data graph of the data mode; and
determine whether the data model is complete after mapping the additional user data onto the data model.

22. The method of claim 20, wherein the system action comprises obtaining additional user data using the navigation information and wherein the navigation information to access at least one remote source.

* * * * *